US009175998B2

(12) United States Patent
Turner et al.

(10) Patent No.: US 9,175,998 B2
(45) Date of Patent: Nov. 3, 2015

(54) BALLAST DELIVERY AND COMPUTATION SYSTEM AND METHOD

(71) Applicant: Georgetown Rail Equipment Company, Georgetown, TX (US)

(72) Inventors: H. Lynn Turner, Leander, TX (US); Nathan Bachman, Georgetown, TX (US); William C. Shell, Georgetown, TX (US); Brian Van Voorst, Minneapolis, MN (US); David Rozacky, Taylor, TX (US); Carlos Martinez, Cedar Park, TX (US); Charles W. Aaron, Salado, TX (US); John Shackleton, Minneapolis, MN (US); Joel Scott Howard, Bedford, TX (US); Jonathan Paul Schewe, Maple Grove, MN (US)

(73) Assignee: Georgetown Rail Equipment Company, Georgetown, TX (US)

( * ) Notice: Subject to any disclaimer, the term of this patent is extended or adjusted under 35 U.S.C. 154(b) by 0 days.

(21) Appl. No.: 14/531,814

(22) Filed: Nov. 3, 2014

(65) Prior Publication Data
US 2015/0057851 A1    Feb. 26, 2015

Related U.S. Application Data

(63) Continuation-in-part of application No. 13/411,256, filed on Mar. 2, 2012, now Pat. No. 8,875,635.
(60) Provisional application No. 61/449,482, filed on Mar. 4, 2011, provisional application No. 61/450,777, filed on Mar. 9, 2011.

(51) Int. Cl.
*E01B 29/00* (2006.01)
*G01F 22/00* (2006.01)
*G01S 17/88* (2006.01)

(Continued)

(52) U.S. Cl.
CPC .............. *G01F 22/00* (2013.01); *E01B 27/02* (2013.01); *E01B 27/022* (2013.01); *E01B 35/00* (2013.01); *G01S 17/88* (2013.01)

(58) Field of Classification Search
CPC ... E01B 2203/065; E01B 27/06; E01B 27/00; E01B 27/023
See application file for complete search history.

(56) References Cited

U.S. PATENT DOCUMENTS

| 5,284,097 A | 2/1994 | Peppin et al. |
| 6,058,628 A | 5/2000 | Theurer et al. |

(Continued)

OTHER PUBLICATIONS

Office Action issued in U.S. Appl. No. 13/411,256 dated Jan. 17, 2014.

(Continued)

*Primary Examiner* — Helal A Algahaim
*Assistant Examiner* — Paul Castro
(74) *Attorney, Agent, or Firm* — Parsons Behle & Latimer

(57) ABSTRACT

A method, performed by a computer having a processor and system memory, for calibrating a tie height of a ballast profiling rail vehicle having a remote sensing system, includes traversing the rail vehicle along a first calibration section of railroad track at a calibration speed, detecting, using the remote sensing system, a plurality of height to tie measurements in the first calibration section, establishing a rolling median average of the height to tie measurements, and determining a calibration tie height relative to the rail vehicle based upon the rolling median average.

23 Claims, 13 Drawing Sheets

(51) Int. Cl.
  *E01B 27/02* (2006.01)
  *E01B 35/00* (2006.01)

(56) References Cited

U.S. PATENT DOCUMENTS

| | | |
|---|---|---|
| 6,526,339 B1 | 2/2003 | Holmes et al. |
| 6,647,891 B2 | 11/2003 | Holmes et al. |
| 6,804,621 B1 | 10/2004 | Pedanckar |
| 6,976,324 B2 | 12/2005 | Theurer et al. |
| 7,969,558 B2 | 6/2011 | Hall |
| 2002/0078853 A1 | 6/2002 | Holmes et al. |
| 2003/0112171 A1* | 6/2003 | Michaelson et al. ............ 342/41 |
| 2006/0089764 A1* | 4/2006 | Filippov et al. ................. 701/23 |
| 2007/0129858 A1 | 6/2007 | Herzog et al. |
| 2008/0228436 A1 | 9/2008 | Farritor |
| 2010/0107925 A1 | 5/2010 | Bounds |
| 2010/0182613 A1 | 7/2010 | Holton et al. |

OTHER PUBLICATIONS

Final Office Action issued in U.S. Appl. No. 13/411,256 dated May 7, 2014.

* cited by examiner

BALLAST DELIVERY AND COMPUTATION SYSTEM AND METHOD

PRIORITY CLAIM

The present application is a continuation-in-part of U.S. patent application Ser. No. 13/411,256, filed on Mar. 2, 2012 and entitled BALLAST DELIVERY AND COMPUTATION SYSTEM AND METHOD, which claimed the benefit of U.S. Provisional patent application Ser. No. 61/449,482, filed on Mar. 4, 2011 and entitled BALLAST DELIVERY SYSTEM AND METHOD; and also claimed the benefit of U.S. Provisional patent application Ser. No. 61/450,777, filed on Mar. 9, 2011 and entitled METHOD FOR CALCULATING MISSING VOLUME AND REGISTERING FIXED INFRASTRUCTURE POINTS FROM OPTICAL PROFILE OF A PHYSICAL SCENE.

BACKGROUND

1. Field of the Invention

The present disclosure generally relates to methods for calculating a volume of ballast needed on a section of railway track, and to systems and apparatus for delivering ballast to the railway track. More particularly, the present disclosure provides a method for calculating missing ballast volume and registering a functional equation to fixed infrastructure using a set of data points obtained in an optical scan of a physical scene, and for automated ballast delivery.

2. Description of Related Art

Railroad tracks are generally constructed on a roadbed base layer of compacted, crushed stone ballast material. Crossties are laid atop the roadbed, and two parallel, flat-bottomed steel rails are attached to the crossties with fasteners, such as tieplates and spikes. After the rails are attached to the ties and the track has been checked for proper alignment, crushed stone ballast is then laid down between and around the ties to further support the ties and allow some adjustment of their position, while also allowing free drainage.

Maintenance of railroad ballast is a significant portion of maintenance-of-way operations for railroads. To provide the desired support to the railroad track without interfering with operation of rail vehicles, it is desirable that the quantity of ballast be maintained as close as possible to a desired ideal level. Too little ballast will not give the desired anchorage for the tracks, while too much ballast can interfere with the wheels and other parts of rail vehicles. For effective drainage it is also desirable to keep the ballast rock clean and relatively free of sand, gravel, dirt, etc. Finally, maintenance operations, such as raising a track, can involve the application of significant quantities of new ballast along an existing track.

Typically, ballast maintenance has involved visual inspection of a section of track by railroad personnel. Once a region is identified where ballast is needed, a ballast train is ordered, and brought to the site. Then, based on visual identification, a worker uses a remote actuator device to open and close outlet doors on ballast hopper cars while walking alongside the moving ballast train, to dump ballast wherever needed. This process can be costly, time-consuming and inaccurate. Visual inspection of railroad tracks requires the time, expertise and good judgment of qualified maintenance personnel. Moreover, even experienced maintenance workers can misjudge the quantity of ballast needed in a given spot, and either apply too much or too little. Where excess ballast is placed, manual labor is required to remove the excess, which is usually wasted (e.g. dumped off to the side of the railroad tracks). Where too little ballast is placed, either a subsequent ballast maintenance operation is required, or the track section in question remains below standards.

The present disclosure is directed to overcoming, or at least reducing the effects, of one or more of the issues set forth above.

SUMMARY

It has been recognized that it would be advantageous to develop an automatic system for evaluating and delivering ballast to a section of railroad roadbed.

It has also been recognized that it would be advantageous to develop a method for surveying ballast conditions on a section of railroad track using remote sensing techniques.

It has also been recognized that it would be advantageous to develop a method for computing needed ballast quantities along a section of railroad track using a computer system provided with ballast evaluation data from a remote sensing system.

In accordance with one aspect thereof, the present disclosure provides a method for delivering ballast to a section of railroad track. The method includes measuring an existing ballast profile of a section of railroad track using a remote sensing system, and providing a signal indicative thereof to a first computer having a processor and system memory. The existing ballast profile is compared with an ideal ballast profile to determine a track file representing a volume of additional ballast needed as a function of linear position along the section of railroad track, using the first computer, and data representing the track file is transmitted to a second computer of an automatic ballast dump train. Ballast is dumped along the section of railroad track according to the track file via the ballast dump train under control of the second computer.

In accordance with another aspect thereof, the present disclosure provides a method, performed by a computer having a processor and system memory, for calculating missing ballast volume on a section of railroad track. The method includes first scanning an existing section of railroad track using a remote sensing system to produce a set of data points representing an existing surface of the railroad track. An ideal surface is then registered with reference to the existing surface to create a volume, the ideal surface defining a full volume level. A number of scan points that fall within the volume and lie below the full volume level is determined. An incremental cross-sectional area is obtained by multiplying a coordinate for each scan point that lies below the full volume level by a magnitude below the full volume level, and a weighted factor associated with the volume. Finally, a total volume is accumulated by multiplying the incremental cross-sectional area by an incremental distance between scan locations and adding all results.

In accordance with yet another aspect thereof, the present disclosure provides a method, performed by a computer having a processor and system memory, for registering a functional equation to fixed infrastructure defined in a set of points. This method includes defining an arbitrary surface, and generating a 3-dimensional point set of a physical scene using a remote sensing system. Points in the point set that represent the fixed infrastructure in the physical scene are found, and landmark points of the fixed infrastructure are defined within the point set. Locations of landmark points in the point set are compared to an expected location of the landmark points, and a numerical difference there between is calculated. The sensed point set is transformed by the calculated numerical difference, and the arbitrary surface is then registered to the location of the landmark points.

These and other embodiments of the present application will be discussed more fully in the description. The features, functions, and advantages can be achieved independently in various embodiments of the claimed invention, or may be combined in yet other embodiments.

Figure 1:
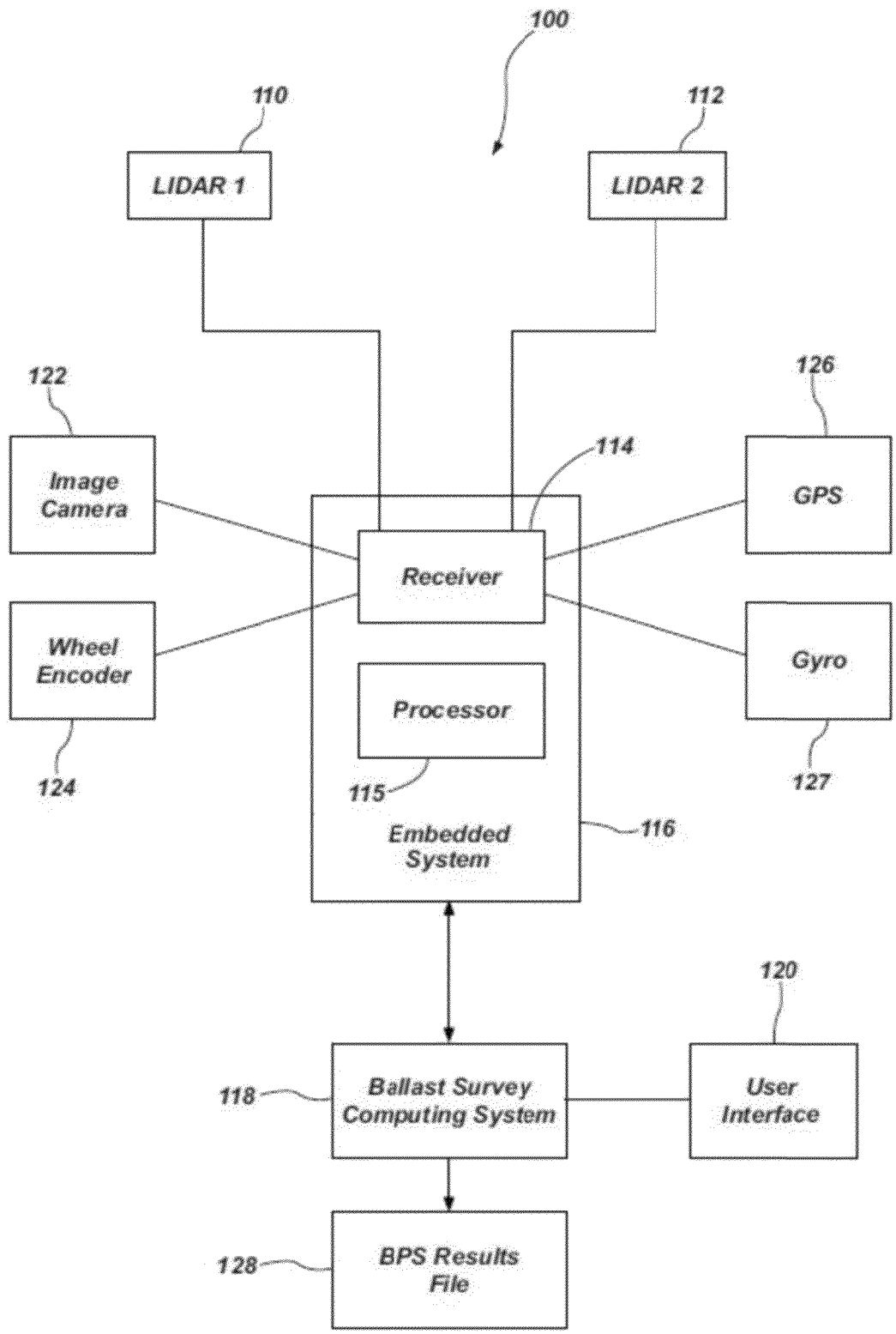
FIG. 1 is a schematic diagram of an embodiment of an automatic ballast profiling system in accordance with the present disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope as defined by the appended claims.

DETAILED DESCRIPTION

Illustrative embodiments are described below as they might be employed in a ballast delivery and computation system and method. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Further aspects and advantages of the various embodiments will become apparent from consideration of the following description and drawings. These embodiments are described in sufficient detail to enable those skilled in the art to practice the invention, and it is to be understood that modifications to the various disclosed embodiments may be made, and other embodiments may be utilized, without departing from the scope of the present disclosure. The following detailed description is, therefore, not to be taken in a limiting sense.

Delivery and placement of ballast along railroad lines is often performed by contractors working for a railroad company. Typically, ballast needs are communicated verbally to an operator of a ballast delivery train by the customer (e.g. the railroad that owns the track section in question), and the ballast is placed according to those needs. The amount of ballast requested by the customer is typically based on experience and track conditions visually evaluated by maintenance personnel of the railroad. Often, more ballast is requested than is actually needed, and ballast may be delivered in areas of the track where it is not needed. At other times, the maintenance personnel may not request enough ballast for a given section, sometimes simply because of cost or budgetary constraints.

The general process of planning, delivering and placing ballast typically includes several basic steps. First, a visual survey of a section of track is made to determine how many car loads of ballast are to be sent to any given area. Following this survey, an operator of a ballast train having X number of ballast cars is told how many miles this number of cars needs to cover. Upon reaching the site, a maintenance worker can walk alongside the ballast train and use a radio transmitter to open or close gates on the ballast cars to drop ballast according to need. The operator uses his best judgment to put down the right volume of rock. However, the ballast may run out too soon or the operator may end up dumping too much ballast near the end of the section.

In another approach, an actual "Survey File" can be created. First, a qualified operator drives a section of track and records distance from a starting point (using an encoder) and volume of ballast required based on a visual survey. The location and ballast volume needed are recorded in a track survey defining "Dump" and "No Dump" zones. During creation of the track survey, the amount of ballast to be dumped is communicated verbally to the operator by the customer (i.e., the railroad Road Master). The quantity of ballast required in each Dump zone along the track is captured in the track survey, which can be created as a computer survey file that can be used by an automatic ballast delivery train. Once the survey is created and the loaded ballast train arrives at the job site, the dump run is initiated from a given starting point along the track. During the dump run, the opening of ballast gates is controlled by a computer system on board the ballast train using the survey file. Unfortunately, visual ballast surveys can be prone to errors, and even experienced maintenance workers can misjudge the quantity of ballast needed in a given spot, and thus create a survey file that either applies too much ballast or too little ballast.

Advantageously, a system and method have been developed for automatic ballast profiling and ballast delivery. The system includes two basic parts: an automatic ballast profiling system, and an automatic ballast delivery system. In one embodiment, the system disclosed herein first produces a ballast profile by scanning a railroad track section using a remote sensing system in order to quantitatively determine the areas of ballast deficiency and the amount of ballast that is required to achieve the "ideal" customer-defined ballast profile. The system then creates a track file that quantifies the ballast needed in any region along the track, and this track file is then transmitted to a host computer of a ballast train, allowing the train to automatically drop ballast according to the track profile.

As shown in the schematic diagram of FIG. 1, an embodiment of a ballast-profiling system disclosed herein, indicated generally at 100, includes one or more LIDAR devices 110, 112, operationally connected to a receiver 114 that is part of an embedded system 116. As will be understood by those of skill in the art, LIDAR stands for Light Detection And Ranging, and is an optical remote sensing technology that measures properties of scattered light to find distance and/or other information regarding an object. LIDAR can be used over large or small distances. The basic method for determining distance to an object or surface using LIDAR is to use laser pulses. LIDAR determines the distance to an object by measuring the phase change of a beam of light between transmission of a pulse and detection of the reflected signal.

The receiver 114 of the embedded system 116 can also receive input from various input and feedback devices such as an image camera 122, a wheel encoder 124, a GPS (Global Positioning System) device 126, and a gyro device 127. The GPS and Gyro devices can be integrated into a single unit (i.e. in one housing) if desired. The system can function without the Gyro device 127. The GPS device 126 is very desirable for overlaying the scanning results on a map. GPS coordinates can also be used to detect curves so that the system can apply the correct ideal profile on the curve. The embedded system 116 also includes a computer processor 115 (including system memory) for running the hardware and receiving input from the LIDARs 110, 112 and other input devices of the ballast profiling system 100.

The embedded system 116 is connected to a ballast survey computing system 118 that performs the ballast profiling calculations. In one embodiment, the ballast survey computing system is a laptop computer that is removably connected via a cable to the embedded system 116 that is permanently installed in the rail vehicle. The ballast survey computing system includes a user interface 120 for receiving user input. The user interface can include a video display, keyboard, mouse, or any other type of user interface devices. The ballast profiling system 100 provides output in the form of a BPS results file 128, as discussed in more detail below.

Figure 2A:
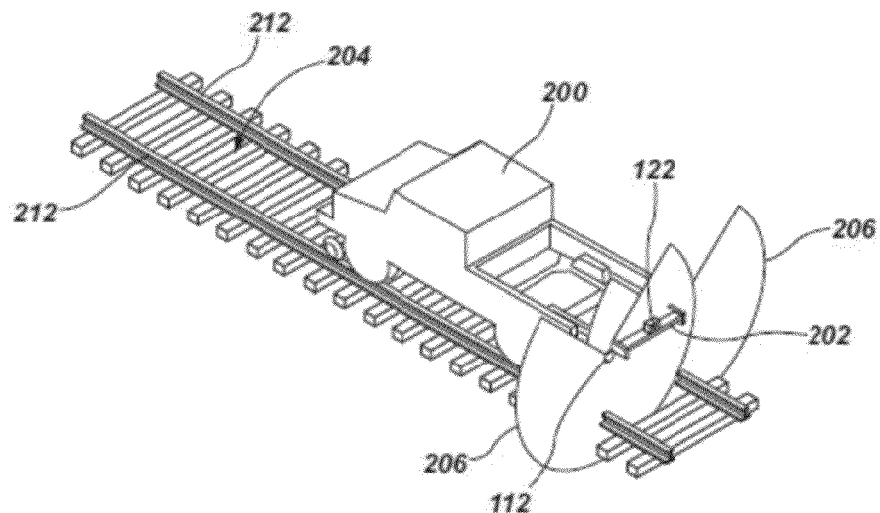
FIGS. 2A-2B are various views of an embodiment of a ballast profiling system attached to a hi-rail vehicle, in accordance with the present disclosure.
Figure 2B:
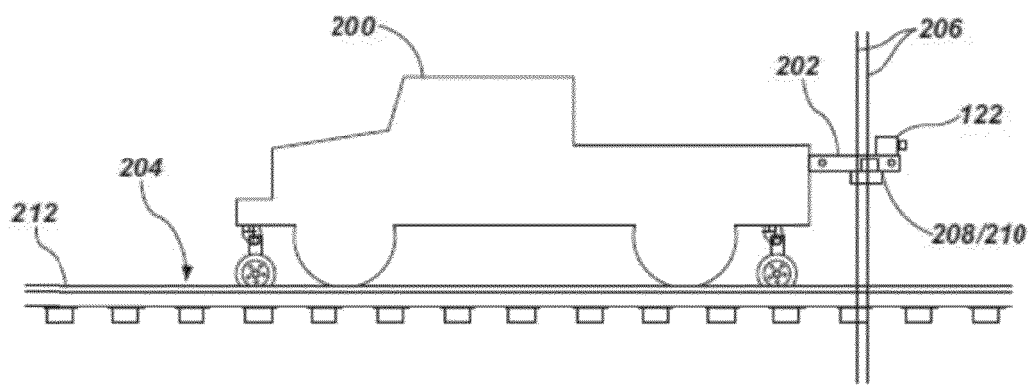
Figure 9:
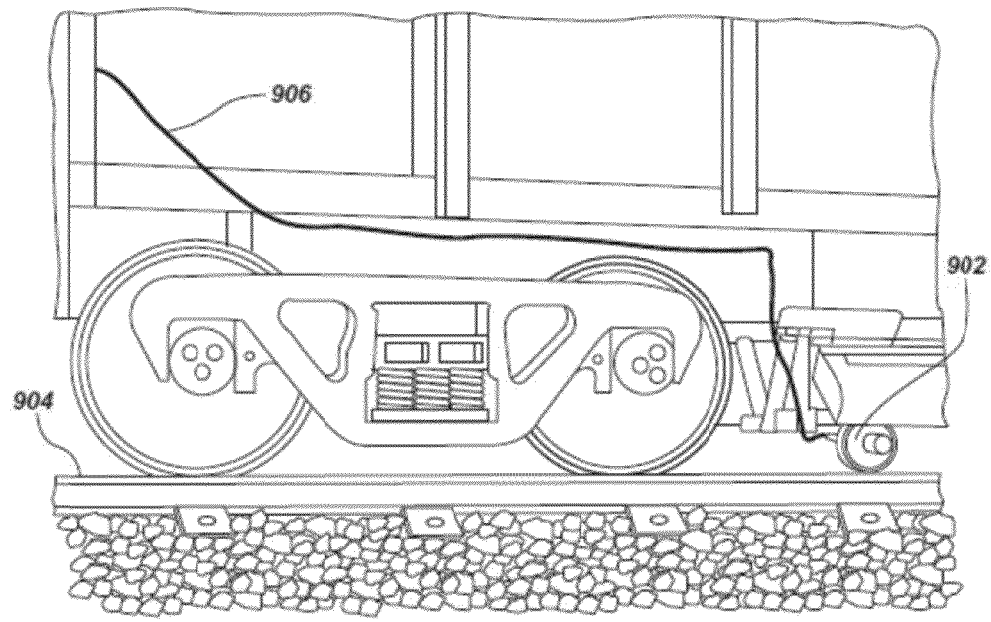
FIG. 9 shows an encoder wheel attached to a ballast car of a ballast train and riding on the rail.

Some or all of the physical components of the ballast profiling system 100 can be attached to a rail vehicle, such as hi-rail truck 200, as shown in FIGS. 2A-2B, or another rail vehicle, such as a railcar or locomotive. The vehicle 200 can also include a wheel encoder (not shown in FIG. 2), similar to the wheel encoder 902 shown in FIG. 9. The vehicle 200 can also include GPS and gyro devices (not shown in FIG. 2) for further monitoring its position. The LIDAR devices 110, 112 can be attached to a frame 202 that extends away from the rail vehicle 200, and oriented downward toward the track, indicated generally at 204. A camera 122 can also be mounted on the frame 202, and oriented to take a video image of the track and surrounding area. While this camera points backward relative to the vehicle 200, the system could alternatively include one or more video cameras that are oriented in other directions, such as forward. The images received from these cameras can be used by an operator to verify the results of the LIDAR data.

The LIDAR devices 110, 112 can be configured to provide pulses of light that sweep in an arc, pictorially represented at 206, across the tracks to give reflection data. As can be seen in FIGS. 2A and 2B, the adjacent LIDAR devices can be staggered in their longitudinal position (i.e. front-to-back relative to the vehicle 200), so that scanning sweep areas 206 of the adjacent devices do not interfere with each other. The reflection of the light beams is received by sensors (not shown) in the respective LIDAR devices. The LIDAR devices 110, 112 typically rotate continuously in a single direction, emitting a beam of light as they rotate. Alternatively, LIDAR devices that sweep back and forth are also known. In one embodiment, the rotational speed of a continuously rotating LIDAR device is about 50 Hz. Other speeds can also be used. It should be noted that the rotational speed of the LIDAR emitters should not be confused with the data sampling rate of the LIDAR system. In one embodiment, the LIDAR ballast profiling system 100 is configured to detect pulses at a rate of 4 signals per degree of arc of the LIDAR emitter. This sampling rate can be multiplied by the rotational frequency of the LIDAR emitters to get a total time-based rate of sampling data. A system having a rotational frequency of 50 HZ and collecting data at 4 samples per degree of rotation can collect 1,440 samples per complete rotation, for a total of 72,000 samples per second. It will be apparent that other sampling rates and LIDAR rotational rates can be used.

While the light beams 206 can be emitted for the full 360 degrees of rotation, the field of view of the LIDAR system can be limited by structure (e.g. internal casing and supports) or the associated system can be designed to ignore a portion of returned data. In the embodiment shown in FIGS. 2A-2B and FIG. 3, the field of view is about 270 degrees. At a sampling rate of 4 samples per degree of rotation, this field of view results in a total of 1080 samples per rotation. While the system shown herein has a field of view of about 270 degrees, LIDAR devices that have a 360 degree field of view can also be used. Such devices can be useful for dimensioning bridges or tunnels, for example. A 360 degree sample can also be desirable to obtain images that show structures near the track that can potentially interfere with railroad operations, or features that are likely to be relevant for construction or maintenance work in the area. Narrower LIDAR beams can also be used. For example, it is believed that a LIDAR system having two adjacent LIDAR devices, each with an arc 206 of about 100 degrees could be used in conjunction with the system disclosed herein.

Figure 3:
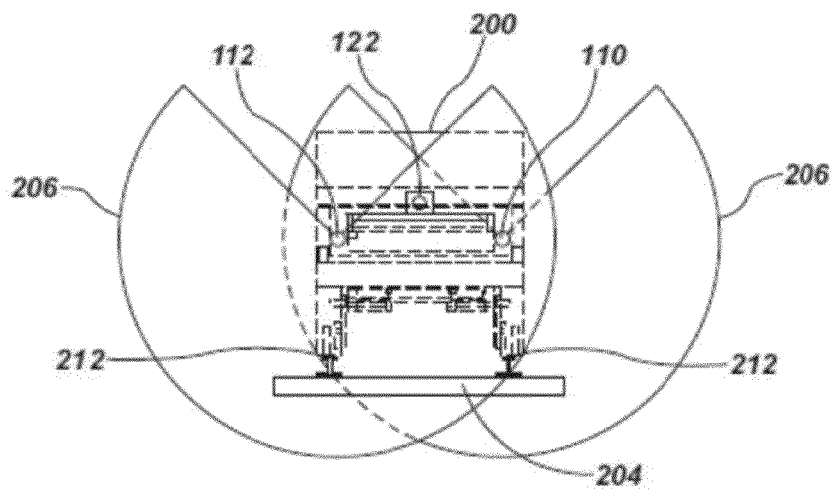
FIG. 3 is a rear view of the ballast profiling vehicle of FIGS. 2A and 2B.

As shown in FIG. 3, the LIDAR devices 110, 112 are positioned above each rail 212 of the railroad track. These components are oriented downward toward the track 204, so as to obtain an image of the rails 212 and other structure. It is considered desirable to create a LIDAR point set that encompasses a total width of, for example, about five feet beyond the end of each railroad tie. The LIDAR devices can also be positioned above and slightly outside of each respective rail, if desired. This can be desirable for minimizing any shadow in the data caused by the top of the rail, since the LIDAR cannot measure through the rail. Other placement positions can also be used.

Referring back to FIG. 1, the ballast profiling system 100 disclosed herein performs two primary tasks: data collection and computation. In the data collection phase, signals from the LIDAR(s) 110, 112, wheel encoder 124, video camera(s) 122, GPS device 126 and gyro 127 are transmitted to the receiver 114, which can comprise an Ethernet hub or other type of connector by which the sensors and other input signals are connected to the embedded system 116. In one embodiment the signals that are received are time stamped by the processor 115, though coupling of these signals can be done in other ways. The processor 115 couples (i.e. synchronizes) the data from the camera 122, GPS 126, and LIDARs 110, 112 with the output of the encoder wheel 124. Using the encoder output indicates where the camera image and LIDAR data was collected. Specifically, the wheel encoder signal can be fed back to the physical LIDAR devices. The LIDARs can be configured to take the wheel encoder data as an input and include it in the LIDAR output signal. In this way the LIDAR devices are tightly coupled by a common wheel encoder value with minimal latency. The GPS and camera data can be similarly tagged. By tagging the GPS data, a tight coupling of wheel encoder and time is provided. Since wheel encoder values can roll over (like an odometer) a virtual counter can be provided that is managed based on the ticks of the wheel encoder.

Data collected by the embedded system 116 is provided to the ballast survey computing system 118. During the data collection phase a user can be responsible for defining the location of No Dump Zones (NDZs) by providing input to the ballast survey computing system 118 through the user interface 120 to interact with the collection software (installed in the ballast survey computing system 118). The ballast survey computing system 118 holds all of the raw sensor data as well as processed sensor data.

Once the data is collected, it is processed by the ballast survey computing system 118 to calculate the volume of ballast needed in each section of track based on an ideal ballast profile for that section of track. It will be appreciated that a variety of computational methods can be used to determine the needed ballast volume based on the remote sensing data and data representing the ideal ballast profile. Once the ballast need is quantified at each location, this data is converted into a BPS Results file 128, which the system can use to automate the ballast delivery, as discussed below.

Advantageously, a very useful computational method has been developed for determining needed ballast volume based on the remote sensing data from the ballast profiling vehicle 200. Using the LIDAR data and the computational method disclosed herein, the ballast survey computing system 118 can calculate an estimate of the missing volume of a space that has been sampled using 3-dimensional points produced by the remote sensing system. As the ballast profiling vehicle 200 (FIG. 2) travels along the rails, the LIDAR devices provide the scanning light beams 206, and transmit the reflections of these light pulses to the embedded system 116.

Figure 4:
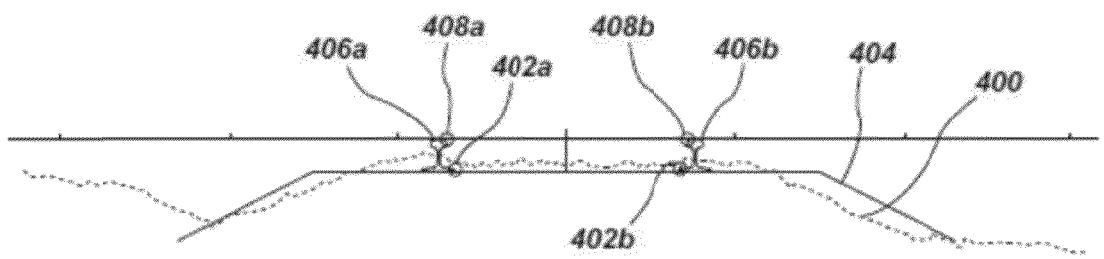
FIG. 4 is an illustration of a railroad roadbed cross-section, showing an actual ballast profile that has been detected in accordance with the present disclosure, and showing a theoretical profile for ballast that is desired on that particular section of track.

Software resident in the ballast survey computing system 118 analyzes the data from the LIDARS and develops a surface represented by a series of points. Based upon the position estimated by the system, the exact location of this surface along the tracks is known, and the surface therefore represents a cross-section of the railroad track at that given location. An example of a detected cross section is shown in FIG. 4. In this figure the existing track cross sectional surface 400 is defined by a series of data points.

Because the LIDAR system scans the track and surrounding ballast/ground surface, these data points include the rails, ties, etc., allowing the software to develop an existing cross-sectional line that correlates with the rail and track geometry. Consequently, the computer system can mathematically superimpose an ideal ballast cross-section upon the measured cross-section to determine any variation, the ideal section being geometrically aligned with the existing track geometry (e.g. registered based on the bottom flange of the rails or the top of the ties). An illustration of LIDAR data points creating an existing cross-sectional line 400 that correlates with the existing rail and track geometry is shown in FIG. 4. A line 404 representing an ideal ballast cross section is also shown in FIG. 4. The ballast survey computing system 118 thus determines the boundaries of a space defined by (i.e. bounded between) the ideal surface 404 and the existing surface 400 that has been sampled by the remote sensing device. In one embodiment, the system is configured to calculate the volume missing from five feet beyond the edge of the tie on each side, or until the ground levels out.

The ballast survey computing system 118 calculates the area of the space by treating each sensor measurement point in the line 400 as an independent statistical sample of the space. This is converted into a volume by multiplying the computed area of the space by the known distance between cross-sectional samples, which is a function of the sampling or refresh rate of the LIDAR and computer system, and the speed of the ballast profiling vehicle (200 in FIG. 2A) along the tracks. In one embodiment, the ballast profiling system scans cross-sectional profiles (each comprised of many data points) at a rate of 50 Hz, while the vehicle travels at a speed of 10 mph, thus providing cross-sectional profiles every 0.294 ft along the track. While in an alternative embodiment the LIDAR profile rate can be speed-dependent, the LIDAR devices can also rotate at a constant rate, as discussed above, so that the slower the vehicle moves, the closer each profile is to the next.

One benefit of this approach is that it does not involve calculation of the actual geometry of the set of measured data points. That is, the points in the existing cross section 400 do not need to be meshed together to form a cohesive surface. Because meshing is not required, the calculation of the needed ballast space can be performed very quickly. In one embodiment, the method disclosed herein has been practiced by registering an ideal ballast profile 404, provided by a railroad company, to a LIDAR scan profile 400 of a section of railroad track, then calculating any missing ballast with reference to the ideal profile.

Figure 5:
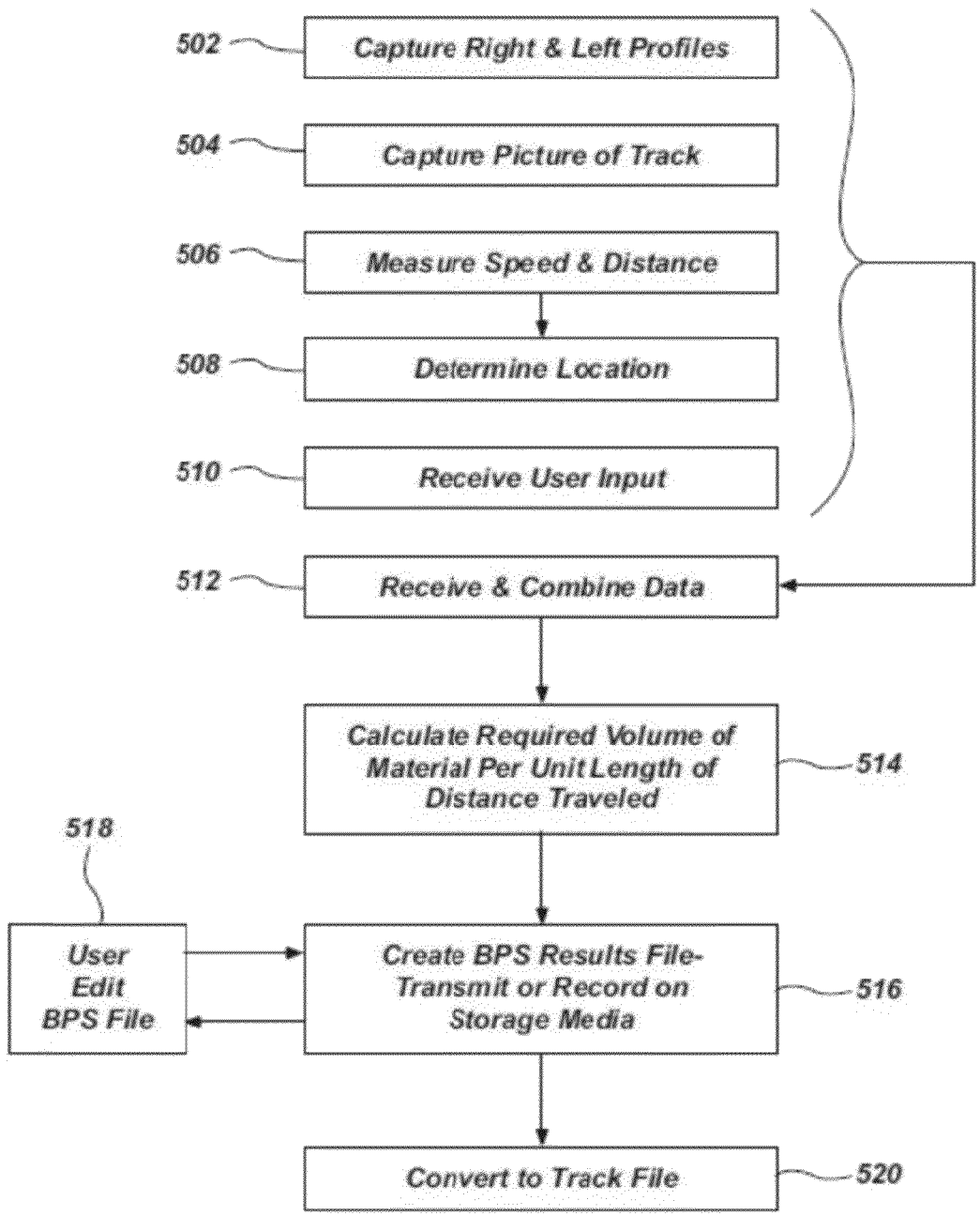
FIG. 5 is a flowchart outlining the steps in an embodiment of a method for creating a ballast profile.

A flowchart of an embodiment of the computational process is shown in FIG. 5. In this process, a portion of existing railroad track surface is scanned with the remote sensing device. Using two LIDAR devices (as shown in FIGS. 1-3), allows the system to capture both left and right cross-sectional profiles of the track, as indicated at 502. The video camera (122 in FIG. 1) also captures a video image of the track, as indicated at 504, while the wheel encoder measures speed and distance of travel of the ballast profiling system (step 506), allowing the system to determine location (block 508). Alternatively, or additionally, the ballast profiling vehicle can determine the location of curves using a GPS device (126 in FIG. 1) in order to apply the appropriate ideal track profile.

While these measurements are being taken, the system can also receive user input, as indicated at 510, for indicating No Dump zone locations (crossings, switches, greasers, bridges, hot box detectors, etc), mile post locations, or a general note (e.g. dump light, steep slope, dump inside track in this section, mud spots, heavy rain, track section has already been dumped, etc.) Steps 502-510 in FIG. 5 can happen generally concurrently, and together provide the data that is received and combined at step 512 to produce a point set (e.g. the points for the surface 400 of FIG. 4).

Using this data, surfaces are numerically registered by the computer to create the boundaries of volume V of interest in the point set. The system calculates how many scan points P sample the inside of volume V. The system then calculates the weighting of the scan points P by taking the surface area of the volume V and dividing it by the number of scan points P. This can be referred to as "point weighting" or P-weight. This is an even weighting method and is one method of determining how much of the profile each point represents. In this approach the point density is higher near the LIDARs and less at the edges of the profile because of the angular spread of the LIDAR beam (206 in FIG. 2A).

Then the system lets L(x,y,z) be the height of full volume of V at position x,y. For each sample point P(x,y,z) that is below the volume level L(x,y,z) (i.e. the point indicates missing ballast), the system calculates the amount of missing volume this represents by taking:

$$Lz - Pz * P\text{weight}$$

Finally, the system accumulates a total of all results of this last step to calculate an estimate of the total missing volume, as indicated at step 514.

This volume data is then stored in a BPS Results file, indicated at step 516. This BPS file can contain 3 main sections: a Config section, a Sample section, and an Overrides section. The Config section can contain information about the data collection, such as software version used, Customer, Operator, Vehicle ID, Encoder ID, Line segment, division, subdivision, main, starting mile post, direction (increasing/decreasing milepost), employee in charge, and date and time of collection. The Sample section can contain the starting point (in feet from starting mark), length (in feet), GPS coordinate, volumes (in cubic feet), and curve (y/n) for each dump section. The Overrides section can contain the type, location, and description of any item considered to be an override. This can be a milepost location, any general note, as well as the location of no dump zones. These overrides can be provided as part of a user edit step 518, shown in FIG. 5.

The process outlined in FIG. 5 can also include the step of converting the BPS Results File to a Track File (block 520). The Track File is a file that can be used with an automatic ballast delivery train to directly control the opening and closing of ballast gates on a ballast delivery train, so as to drop ballast according to the ballast needs determined during the computational steps in creating the BPS File. As discussed below, either the Track File 520 or the BPS File 516 can become the Input File (602 in FIG. 6) for a ballast delivery train.

As an alternative to even point weighting in step four, a variable weighting approach can be used, in which each point is weighted based on the spacing between each point and its nearest neighbor in each direction. Points that are further apart will have a higher weight than points near each other. In this case each unique point Px,y will have a weighting Px,y-weight. The weighting can be based on the percentage of the whole profile each point represents. For example, where the entire profile is about 19' wide, each point represents a portion of that profile, but since the points are not evenly spaced across the 19' width, the points that are further apart are weighted proportionally heavier. When using this alternative method, the missing volume determined in step 514 for each sample point will be calculated by:

$$Lz - Pz * Px,y\text{Weight}$$

Another aspect of the ballast profiling system disclosed herein is the process of registering the data points that are sampled by the laser profiling system in order to compensate for vibration and other possible irregularities that can skew the data. This can be accomplished by registering a functional equation to an expected fixed infrastructure point found in a point set. This method involves taking an arbitrary surface, defined by a functional equation, and mapping that surface into a point cloud or point set model of the real world. This is accomplished by first finding a subset of points in the point set that represent the fixed infrastructure, then finding a few select points in the subset that represent known landmarks. Using knowledge of the rigid properties of the fixed infrastructure and the geometry of the landmarks, a transformation function is generated that rotates and/or translates the surface to the fixed infrastructure of the physical world.

This approach has been put into practice by registering an "ideal" profile for ballast provided by a railroad company to a set of LIDAR scan data of a section of railroad track. The LIDAR scan data is first processed to find landmark points on the rails. Based on the coordinates and geometry of the landmark points, the ideal profile is then fit into the scene.

Some specific landmark points utilized in one embodiment are shown in FIG. 4. These points are the inside bottom lip 402a, b of the left and right rails 406a, b, and the topmost inside edge 408a, b of the left and right rails 406a, b, respectively. These points can be found by their unique characteristics relative to the points that come before and after them as the LIDAR scan cuts crosswise across the rail. Other landmark points can also be used, such as the top outside corner of a rail, the bottom outside corner of a rail, a top surface of a crosstie, a top outside corner of a crosstie, etc. Once these landmark points are identified, any vibration of the LIDAR sensor can be removed from the sensed data by comparing the location of these landmark points with the expected location of the landmark points. The expectation of the landmarks can be extrapolated from the landmark points of several past scans. Once the vibration is removed, the location of the surface can be identified, and registered to the LIDAR data.

The process can be outlined as follows. First, the system defines an arbitrary surface. Then a 3-dimensional point set or point cloud of a scene in the physical world is generated using remote sensing technology (such as a LIDAR). Next, points in the sensed point set are found that represent the fixed infrastructure of the physical world. Then landmark points of the fixed infrastructure (e.g. points 402, 406) are identified within the sensed point set. The location of the landmark points in the point set is then compared to expected locations of the landmark points, and a positional difference is calculated. This positional difference can include rotational differences. The expected location of the landmark points is based on an accumulation of prior calculations of location of landmark points from previously sensed scenes and/or knowledge of fixed infrastructure.

The sensed point set is then transformed by location differences calculated in the previous step. This transformation can include translation and/or rotation. Next, the arbitrary surface is registered to the location of the landmark points calculated previously. Next, the point set that has been derived is used to update the expected location of landmark points for subsequent scenes. The process is then repeated for a subsequent scene, beginning with the step of generating a 3-dimensional point set or point cloud of the subsequent scene.

Figure 11A:
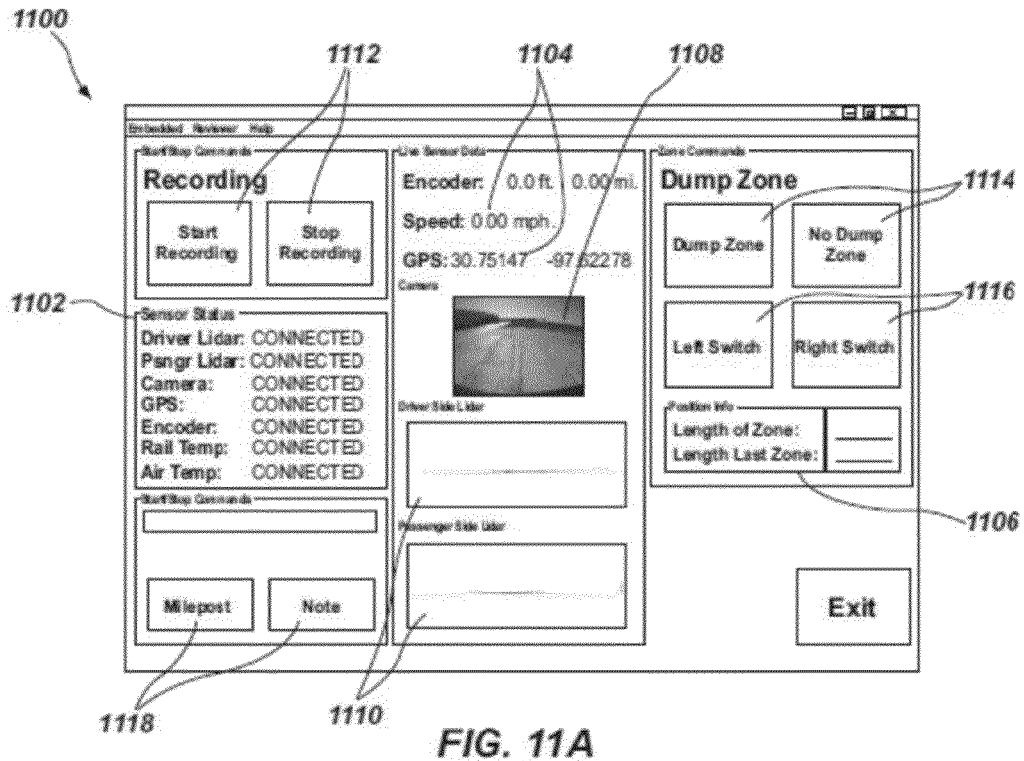
FIG. 11A is an exemplary screen shot of an embodiment of a graphical user interface for the data collecting portion of a ballast profiling and computation system.
Figure 11B:
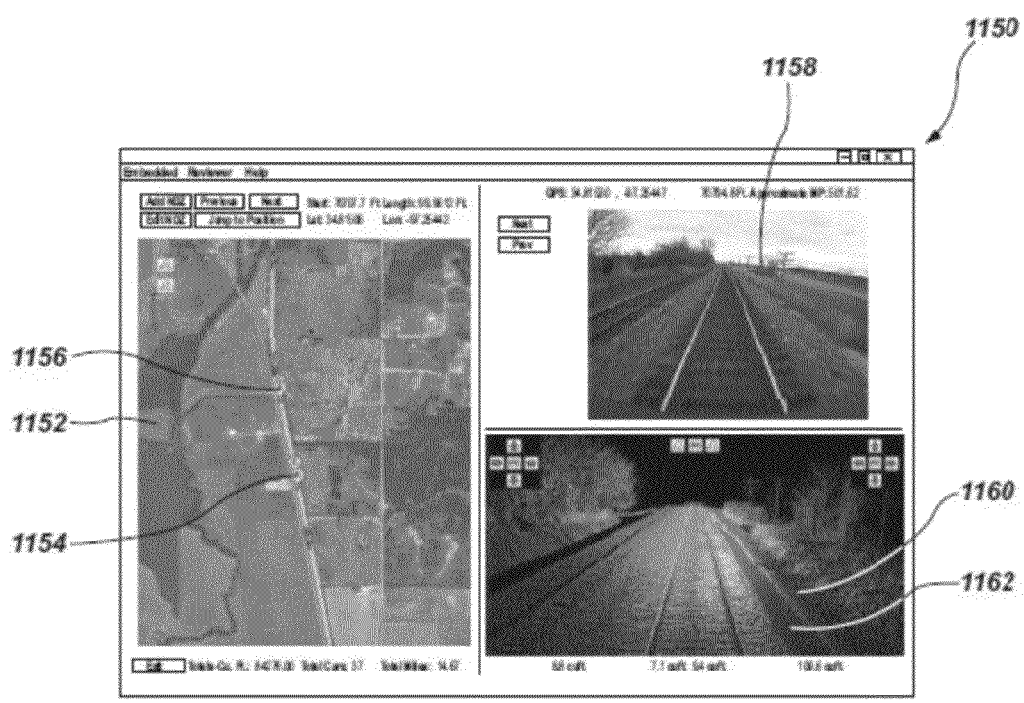
FIG. 11B is another screen shot of a portion of the graphical user interface for the reviewer portion of the ballast profiling and computation system, showing a track file map and showing other information related to a ballast profile along a given section of railroad track.

The computational system disclosed herein can also include other features that enhance its functionality. For example, the ballast survey computer system can include a graphical user interface, exemplary images of which are shown in FIGS. 11A-11B. It will be apparent that the user interface can be configured in a variety of ways, and that the particular user interfaces shown in these figures are exemplary only. Shown in FIG. 11A is an embodiment of a user interface 1100 for the data collecting portion of the ballast profiling and computation system. This user interface can be part of the ballast survey computer system (118 in FIG. 1) that is used in the ballast profiling vehicle (200 in FIG. 2A).

The data collecting user interface 1100 provides data such as sensor status data 1102, position and speed information 1104 for the ballast profiling vehicle (200 in FIG. 2A) and information regarding the length of present and past profiling zones 1106, as well as visual feedback showing a video image of the current track 1108, and the current track section profiles 1110 that have been determined by the LIDAR scanning. In the cross-sectional track profiles 1110, the LIDAR points can be color-coded based on how far they are below the ideal profile. The user interface 1100 also provides buttons for starting and stopping recording 1112, to indicate dump zones and no dump zones 1114, to indicate when the vehicle encounters track switches 1116, and to input milepost data and notes 1118. This latter feature allows milepost markers and notes to be captured and put on a map (1152 in FIG. 11B) with corresponding data. All of the above information is used to create the BPS Results File, (516 in FIG. 5) which is then used to create the Track File (520 in FIG. 5), as discussed above. Other data output and user input options can also be provided as part of the data collection user interface 1100.

Shown in FIG. 11B is another screen shot of another portion 1150 of the graphical user interface for the reviewer portion of the ballast profiling and computation system. This view is the Reviewer portion of the data collecting user interface, which is associated with the ballast survey computing system (118 in FIG. 1) and can be used with the ballast profiling vehicle 200 in FIG. 2A, or separate from it. This user interface 1150 is designed to allow a user to review and edit the ballast survey information after the data is collected and processed, as discussed above with respect to block 518 in FIG. 5. This interface can include a map 1152 on which various data and information related to the ballast profile can be displayed for a user. This map can be configured to allow a user to manipulate at least some of the data, or manipulate how it is shown in various ways. For example, as discussed above, the ballast profiling system can capture, and show on the map 1152, a NDZ (No Dump Zone) beginning point 1154 and ending point 1156, and allow a user to edit them. The user can add or modify Dump and No Dump zones, override the volume of ballast required, adjust mileposts, notes, and even override a "lift" value, so that the track can be raised. A user can also edit No Dump Zones in the LIDAR window, 1160 in FIG. 11B. The map interface can also be provided with clickable sections of data, such as corresponding to the sections at which a user will command the ballast train to drop rock, and can also show curves and spiral easements, truck position corresponding to the picture 1158 and LIDAR data 1162 currently displayed. The map 1152 can also be color-coded based on measured need of rock in various areas, and/or based on the number of gates of rock that will be dropped. For example, the quantity of ballast needed can be indicated by color coding the individual LIDAR data points in the LIDAR view window 1162, or by color coding scan area on map view 1152.

This interface 1150 can also include a video image 1158 of the current track section, and a 3D LIDAR model or image 1160 that shows the current track section and the environment around the track. An enlarged and color-inverted version of a LIDAR image 1200 of a section of railroad track and surrounding features is provided in FIG. 12, and discussed below. A model of the surrounding area can be desirable for detecting the presence of potentially conflicting track-side structures, as discussed below, and to allow inspection of missing rock, for example. The LIDAR image 1160 can also be color-augmented, for example, to include shaded areas 1162 that indicate the relative need for ballast in various areas. Additionally, an ideal track profile can be drawn over the LIDAR picture 1160 to illustrate where the existing ballast profile lies relative to the ideal profile. It will be apparent that the user interfaces 1100, 1150 can also be used to display and/or receive other information and to display it in various other ways.

Referring back to FIG. 5, once the BPS Results File is created (step 516) and edited as desired (step 518), or the Track File is created (step 520), either of these files can be downloaded as the Input File (block 602 in FIG. 6) to the ballast train computer system (604 in FIG. 6; 800 in FIG. 8), which controls the actual delivery of ballast. That is, the Input File 602 can be either the BPS File 516 or the Track File 520. As noted above, a laptop computer is one type of device that can be used as the ballast survey computer system (118 in FIG. 1). Advantageously, the same computer device can also be used as the ballast train computer (604 in FIG. 6; 800 in FIG. 8) if desired. That is, the very computer device that is provided with software to receive and analyze the ballast profiling data and compute the BPS Results File 516 can also be provided with software for creating the Track File 520 and can be associated with the ballast delivery train to function as the ballast train computer system, controlling ballast drop gates to automatically deliver ballast. Alternatively, the ballast train computer system can be a different physical piece of hardware that is simply provided with suitable software to receive the Track File as its Input File 602, or to receive the BPS file as the Input File and convert it to a Track File.

The ballast profiling system disclosed herein can be used to scan a small section of track or many miles of railroad track, such as an entire subdivision, division, line segment, or even an entire track system (or any portion of any of these), and determine ballast shortfalls. Based on these shortfalls, the system can create ballasting plans for those regions or for the entire system. This system can be used to prepare for an immediate ballast dump run, or for mid- to long-term planning purposes. For example, ballast can be dumped on a given section of track immediately or within hours of having collected the data, or the data can be used for a multi-year plan, or anything in between. It is believed that many users of this system may desire to create a dump plan on a quarterly or yearly basis, for example. This ballasting plan can then be implemented by automated ballast delivery systems, if desired.

Figure 6:
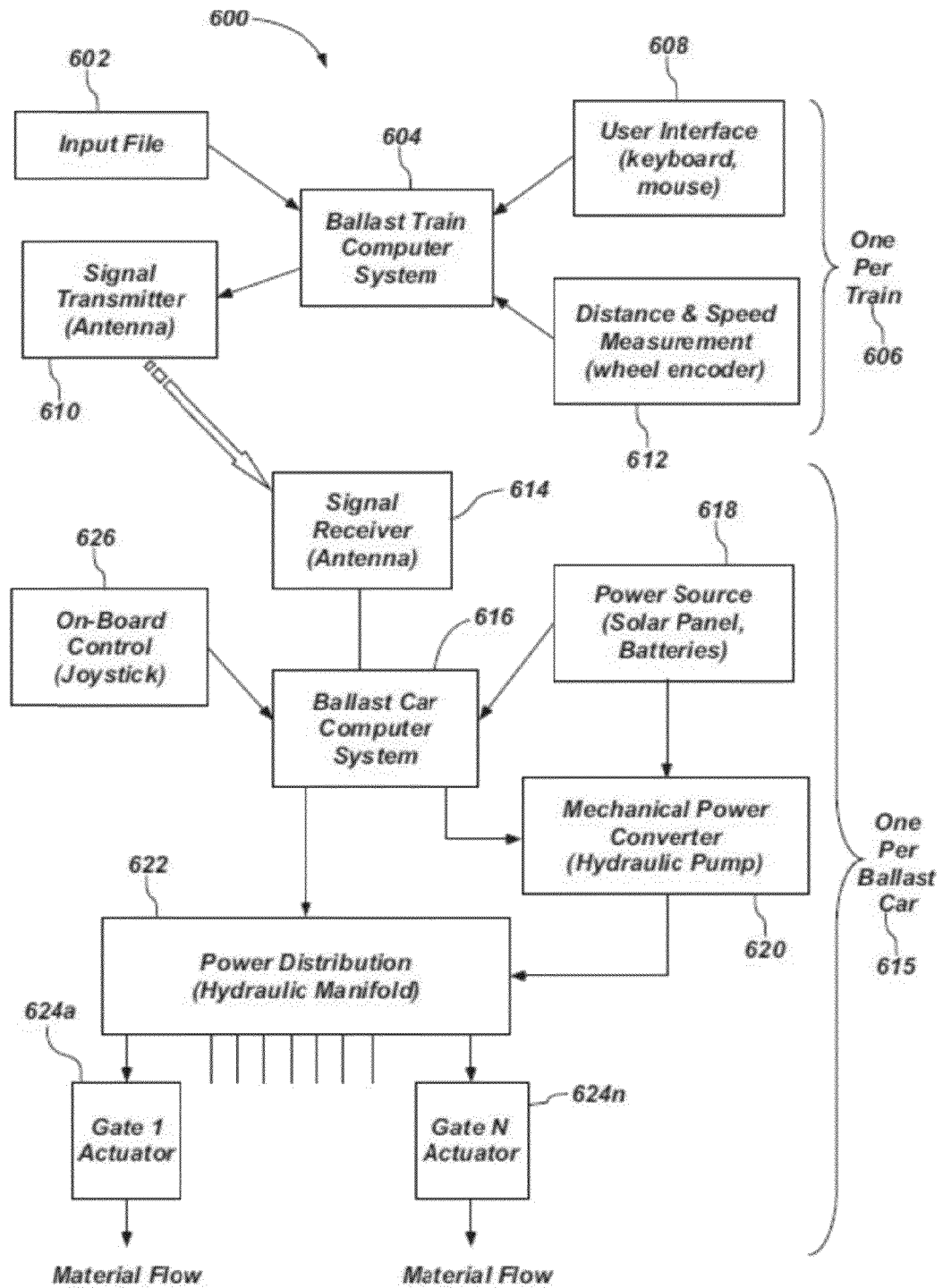
FIG. 6 is a schematic diagram of an embodiment of an automatic ballast delivery system in accordance with the present disclosure.
Figure 7:
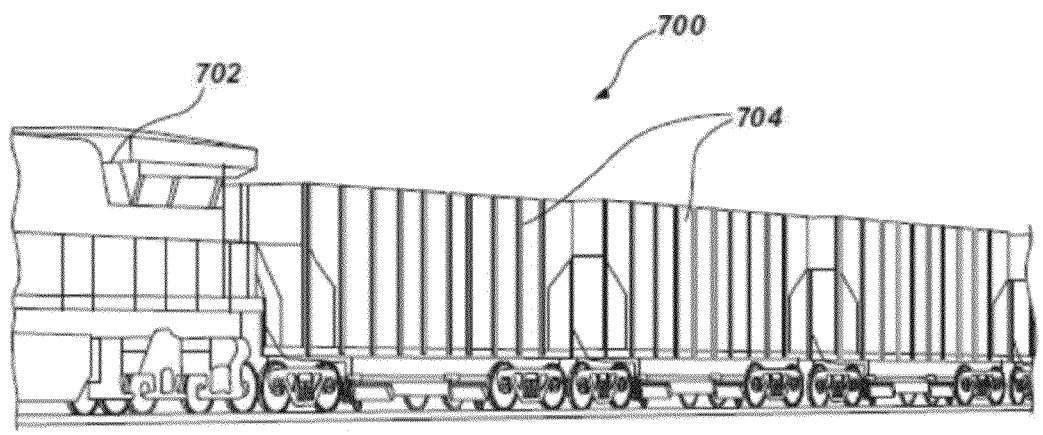
FIG. 7 is a perspective view of a ballast train having an embodiment of an automatic ballast delivery system in accordance with the present disclosure.
Figure 8:
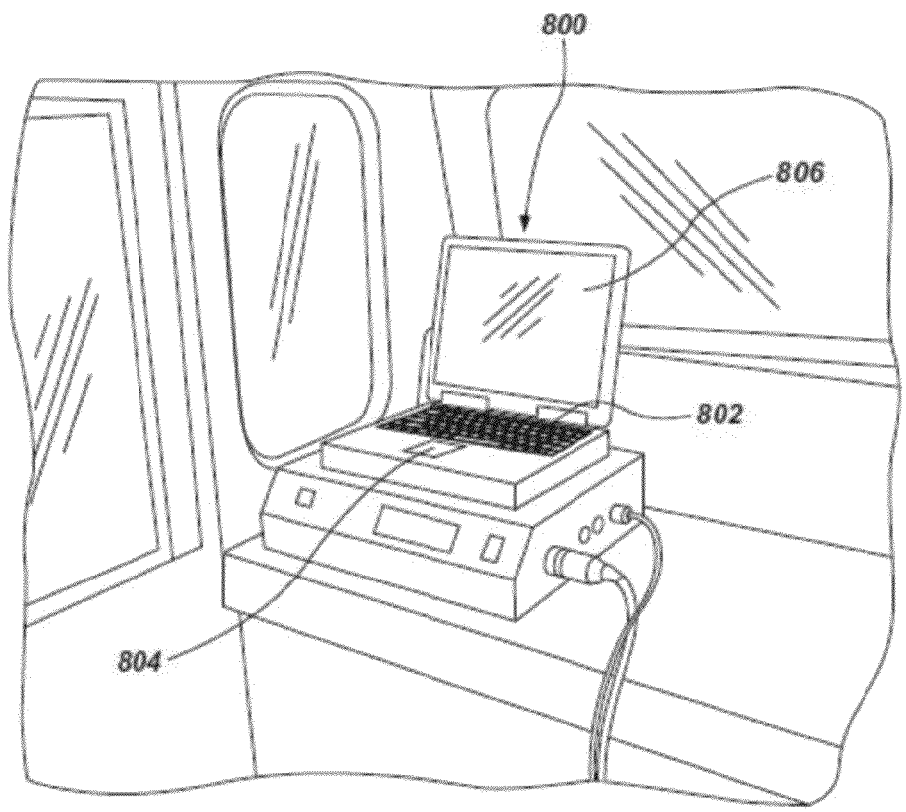
FIG. 8 is an illustration of a host computer associated with a ballast train.

As noted above, automated ballast delivery systems have been developed that control gate actuators on each car of a ballast train using software running on a host computer associated with the train. A schematic diagram of an embodiment of an automatic ballast delivery system 600 associated with a ballast train is shown in FIG. 6. A perspective view of a ballast train 700 having an embodiment of an automatic ballast delivery system in accordance with the present disclosure is shown in FIG. 7. The ballast train 700 includes at least one locomotive 702 pulling a series of ballast hopper cars 704. The ballast train can also include a host computer 800 located in the cab of a locomotive of the ballast train, as shown in FIG. 8. As noted above, the host computer 800 can be the same physical device that serves as the ballast survey computing system (118 in FIG. 1). The host computer system includes a keyboard 802 and touchpad 804 for data entry or control by a user, as well as a video display 806 for feedback to a user. It will be apparent that the ballast train host computer can be configured in a variety of other ways as well.

Referring to FIG. 6, after the ballast profiling operation is complete, as described above, the Input file 602 is loaded onto the ballast train computer system 604 (which can be the same as the host computer 800 shown in FIG. 8). Loading of the Input File is indicated at block 602 in FIG. 6. As indicated at 606 in FIG. 6, there can be one ballast train computer system per ballast train. The ballast train computer system includes a user interface 608, such as a keyboard, mouse or touchpad and display, as described with respect to FIG. 8, and a signal transmitter 610 for transmitting commands to individual ballast cars, as described below. As noted above, the ballast train computer system 604 can receive either the BPS File (516 in FIG. 5) or the Track File (520 in FIG. 5) as its input file (block 602). In one embodiment, the ballast train computer system is provided with software for creating the Track File based on the BPS Results File. In an alternative embodiment, the ballast survey computing system (118 in FIG. 1) can be provided with software for creating the Track File, as indicated at 520 in FIG. 5, and this file can be downloaded to the ballast train computer system 604 as the Input File at block 602. The Track File includes specific commands to open and close ballast drop gates during a ballast unloading run, as described below. In one embodiment, the Track File includes no GPS data, but includes only distance information, which will indicate position along the tracks and number of ballast gates to open based on location and speed of the ballast train.

Also associated with the ballast train computer system 604 is a distance and speed measurement device 612. In one embodiment, this device can be an encoder wheel, such as the encoder wheel 902 shown attached to a ballast car in FIG. 9. The encoder wheel rides atop the rail 904 with the ballast train and sends an accurate signal (e.g. via a communication wire 906 or radio transmitter (not shown in FIG. 9)) to the ballast train computer system 604 indicating distance traveled from some reference point. The reference point can be, for example, the beginning of a segment of track on which ballast is to be dumped. Referring back to FIG. 6, the wheel encoder 612 can be used to determine train speed, distance traveled, and position of the first car on the train relative to the starting position of the track survey.

When the loaded ballast train arrives at the job site, the wheel encoder 612 is set to the mark indicating the starting point of the unloading run, and appropriate input is given to the ballast train computer system 604 indicating that location, so as to calibrate the actual location with the computed ballast run of the BPS file. As the ballast train begins the run, the computer 604 sends wireless signals via the signal transmitter 610 to a signal receiver 614 associated with each ballast car 615. It is to be appreciated that block 610 is intended to encompass all items of hardware, software, etc. that are involved in transmission of signals from the ballast train computer 604 to the signal receiver 614 of the ballast cars, including an encoder, antenna, etc. Likewise, block 614 is intended to encompass all items of hardware, software, etc. that are involved in the reception of signals from the ballast train computer 604, including a decoder, antenna, etc. The devices and elements that are involved in these functions can be combined or separate.

Each ballast car can have a ballast dump control system that includes the signal receiver 614, a computer controller 616, a power source 618, a mechanical power converter 620, and a power distribution manifold 622 that controls a plurality of gate actuators 624a-n of the ballast car. The power source 618 drives the computer system 616 and the power converter 620, and can be, for example, a battery pack or solar panels. The power converter 620 can be a hydraulic pump. The power distribution manifold 622 can be a hydraulic manifold, comprising a plurality of hydraulic valves, which is controlled by the computer controller 616 and receives power from the power converter 620. The ballast car control system can also include an on-board control device 626, such as a joystick, which can be used to control ballast dumping directly, in case of malfunction of the ballast train control system, the wireless transmission system, or for any other reason. It is also possible for the hydraulic valves to be controlled by the computer system 616 or by the receiver-decoder unit 614.

As the ballast train begins the run, the host computer 604 sends wireless signals via the radio signal transmitter 610 to the signal receiver 614 associated with each ballast car 615. In one embodiment, the ballast train computer system 604 can be configured to send a command (open or close) to any specific gate 624 on any specific car 615.

Figure 10:
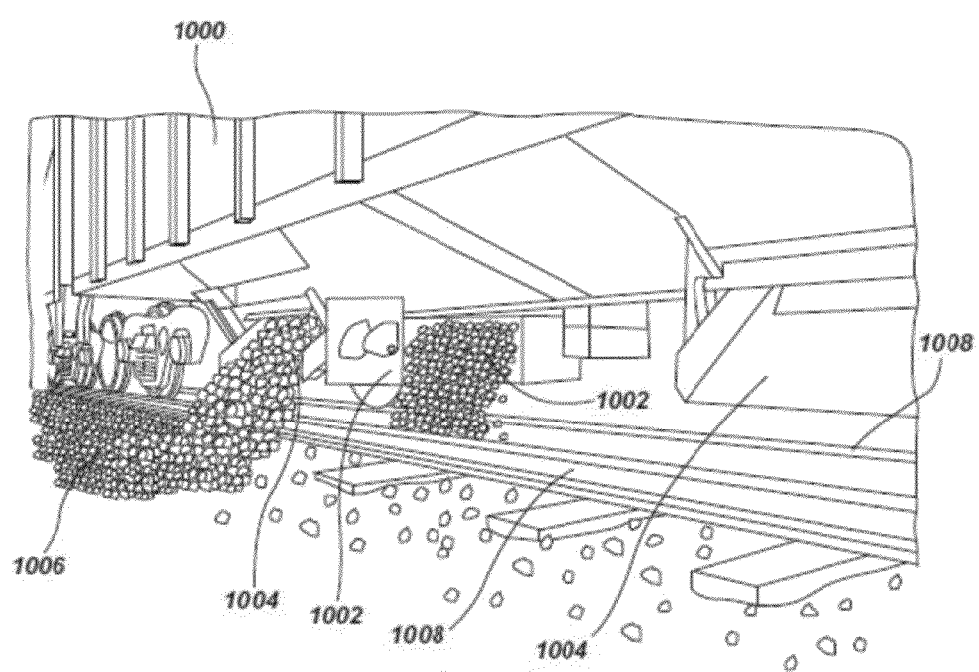
FIG. 10 shows the underside of a ballast car selectively dumping ballast between and to one side of a section of rails.

The configuration of the ballast cars can vary. In one embodiment, each ballast car is equipped with eight ballast gates, indicated by ballast gate actuators 624a-n. These can be configured with four gates that dump toward the inside of the rail, and four gates that dump to the outside of the rails. FIG. 10 shows the underside of a ballast car 1000 having inside ballast gates 1002 and outside ballast gates 1004, selectively dumping ballast 1006 between the rails 1008 and to one side of the rails.

In one embodiment, the system can compute the ballast needed to achieve a 1" or 2" lift of the track, for example, in addition to or instead of calculating simple addition of more ballast. The software can also allow an operator to review the processed data and adjust zone boundaries and/or override the amount of ballast to be delivered along the track.

While the system and method disclosed herein shows the ballast profiling vehicle (200 in FIG. 2) and its associated computer system (118 in FIG. 1) being separate from the host computer 604 and systems associated with the ballast train, it is also believed that ballast profiling and ballast delivery can be combined into a single system. For example, a ballast train like that shown in FIG. 7 can be provided with a ballast profiling system like that of FIGS. 1 and 2, whether mounted to the locomotive or to a railcar at the front of the train (not shown) or in some other way, with a computer system that computes ballast needs on-the-fly, and transmits those needs directly to actuators on the ballast cars (704 in FIG. 7) as the train 700 moves along a section of railroad track. So long as the computer system(s) has/have sufficient computational power to analyze the existing ballast conditions and compute needed ballast volumes between the time that the ballast profiling system passes over a given point and the ballast car(s) with the needed supply reach that point, such a system could allow ballast profiling and ballast delivery to be accomplished in a single operation. Moreover, a single computer system could control ballast profiling and computation and ballast delivery at the same time in such an operation.

Figure 12:
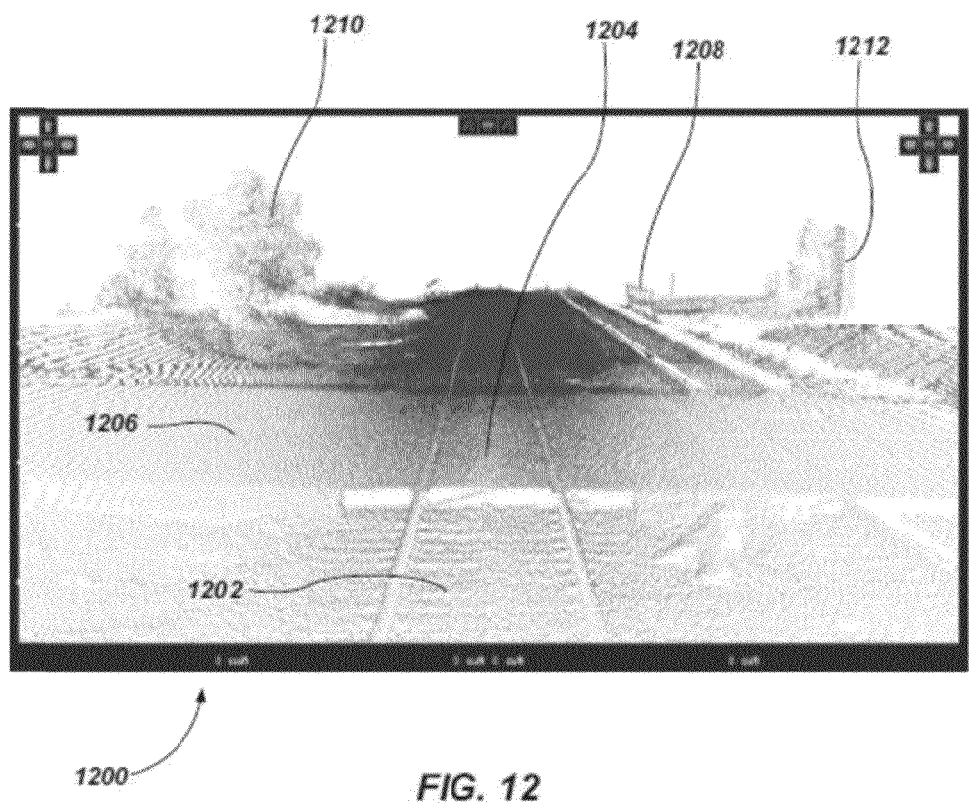
FIG. 12 is a LIDAR image of a section of railroad track, showing a grade crossing and surrounding features.

Shown in FIG. 12 is an inverted LIDAR image 1200 of a section of railroad track, showing a grade crossing and surrounding features. This image is color inverted from the LIDAR image 1160 shown in FIG. 11B (i.e. the image 1160 shows white lines or dots on a black background, whereas the image 1200 presents black lines or dots on a white background) for clarity, and is presented to illustrate another feature of the system disclosed herein. As noted above, the system disclosed herein can determine how the profile of ballast differs from a specific "ideal profile" in a given area, and determine the volume of ballast required to bring the profile to the ideal profile, or calculate the volume of ballast required to raise the track a prescribed amount and bring the profile to the ideal profile at that new elevation. However, it has also been found that the track profiles that are used to create the LIDAR profile can also be used to measure the dimension of other items that are within the railroad right of way.

One particular type of item frequently encountered in the railroad right of way is a grade crossing. The LIDAR image 1200 in FIG. 12 shows a section of railroad track 1202 with a grade crossing 1204 across a road 1206. Using this type of image, a variety of characteristics can be measured or calculated. For example, the length and width of the crossing 1204 can be measured, and the vertical angle of approach of the road 1206 can be measured (i.e. the grade change or angle at the point where the road surface meets the tracks). This type of image can also be used for highways as well as railways, and can be used to measure overhead clearances, slope or profile or roadways and shoulders, detect condition of pavement, etc. This information can be used for a variety of maintenance and analysis purposes.

Another use for the LIDAR image 1200 is to determine whether objects protrude into a prescribed safety envelope around the track. For example, the image 1200 shows objects near the right of way such as a railing 1208, trees 1210, utility poles 1212, etc. Other objects that are likely to be in or near the right of way can include fences, buildings, railroad signals and appurtenances, etc. The LIDAR image 1200 allows the system to optically determine the location of such items, and calculate whether they intrude into the safety envelope around the track. This can allow automatic identification of track locations where maintenance or other work may be needed to bring the right of way up to desired standards for geometry and safety.

Figure 13:
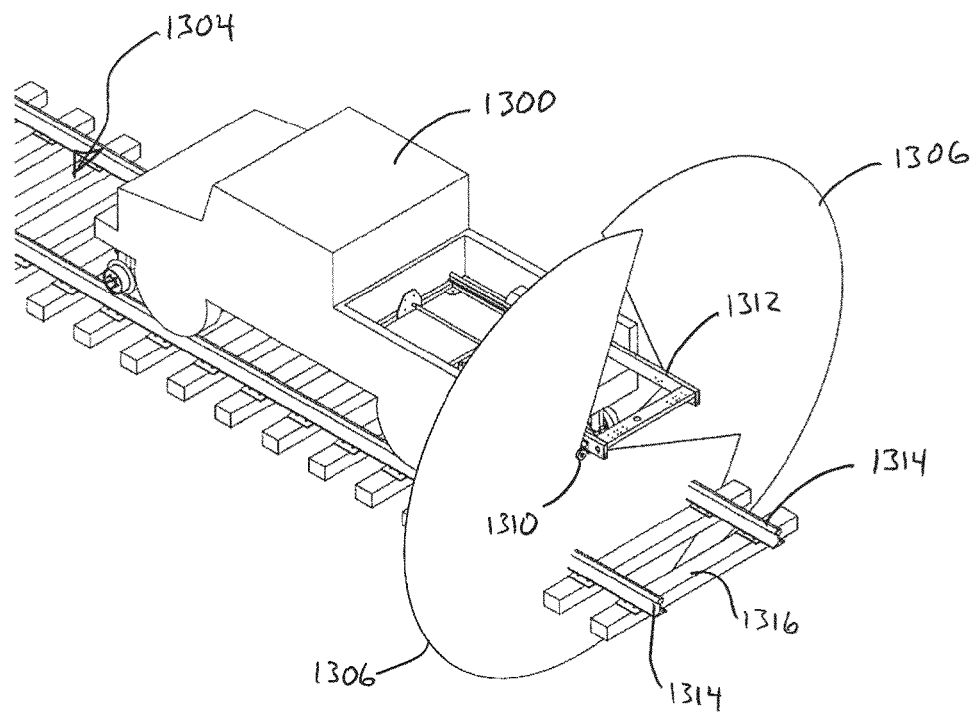
FIG. 13 is a rear perspective views of another embodiment of a ballast profiling system attached to a hi-rail vehicle, in accordance with the present disclosure.
Figure 14:
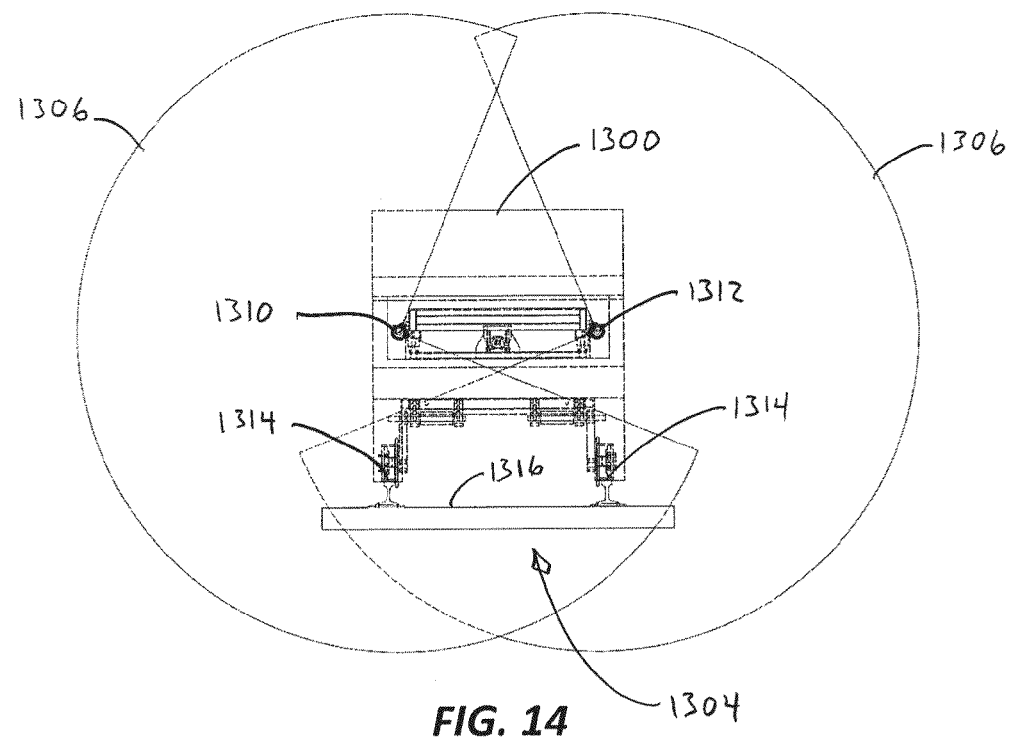
FIG. 14 is a rear view of the ballast profiling vehicle of FIG. 13.

As discussed above the physical components of the ballast profiling system can be attached to a rail vehicle, such as hi-rail truck 200, shown in FIGS. 2A-2B. Another embodiment of hi-rail vehicle 1300 that can be used in this process is shown in FIGS. 13 and 14. This vehicle 1300 is similar to the vehicle 200 shown in FIGS. 2A-2B and FIG. 3, and can generally include all of the features and capabilities described with respect to that vehicle, such as a wheel encoder, GPS and gyro devices, cameras, etc. The LIDAR devices 1310, 1312 of this vehicle are oriented downward toward the track 1304, and one or more cameras (not shown) can be oriented to take a video image of the track and surrounding area. The LIDAR devices 1310, 1312 are positioned above each rail 1314 of the railroad track, and are oriented downward toward the track 1304, so as to obtain an image of the rails 1314 and other nearby structure, and provide pulses of light that sweep in an arc, pictorially represented at 1306, across the tracks to give reflection data, which is received and processed in the manner discussed above.

The sweep or field of view 1306 of each LIDAR emitters 1310, 1312 can be about 270 degrees, as with the embodiment shown and described above with respect to FIGS. 2A-2B and FIG. 3. Advantageously, however, the orientation of the field of view of each LIDAR device can be rotated outward, away from the center of the rails, as shown in FIGS. 13 and 14, so that both LIDAR devices still scan both rails 1314 and also the ties 1316, but also scan a greater region above and to the sides of the track 1304 and the vehicle 1300. This broader sweep configuration can be useful to show structures near the track, and also for dimensioning bridges or tunnels, for example, yet without having 360 degree LIDAR emitters. As another alternative, the LIDAR devices can be rotated cross-track. For example, the LIDAR devices can be rotated to cross at some specific angle (e.g. 45°) relative to the track. Other LIDAR devices, such as those with a 360 degree field of view can also be used.

For a ballast scanning system to accurately estimate an amount of ballast that is needed, it is desirable that the system be able to register the geometry of the ideal ballast profile to the scene representing the actual ballast profile. It is desirable that the ideal profile is matched to the tops of the ties with a relatively tight tolerance in order to be representative of all ties. Because this desired tolerance is relatively tight, it is desirable to only consider tie tops, and not the ballast between the ties, which could distort the measurement. This condition suggests that calibration of the geometric features of the ballast scanning vehicle and its scanning system relative to the ties and/or other track features is desirable.

There are various approaches that can be taken for calibrating the ballast scanning vehicle with the track features. One approach that has been used is to measure, e.g. using a measuring tape, the height of each LIDAR device 3110, 1312 above the top of the rails 1314 and the top of a tie 1316 when the scanning vehicle 1300 is stationary. Unfortunately, this approach can be prone to human error in measuring, and it can be difficult to find a tie measurement point that is representative for all ties 1316. Also, since the top of the rails 1314 includes some amount of curvature across the rail head, the exact point of measurement can introduce some error into the measurement. Additionally, since the ballast scanning vehicle 1300 can move up and down on its suspension while it is traveling down the track 1304, it is also desirable to model this motion when registering the ideal profile.

Figure 15:
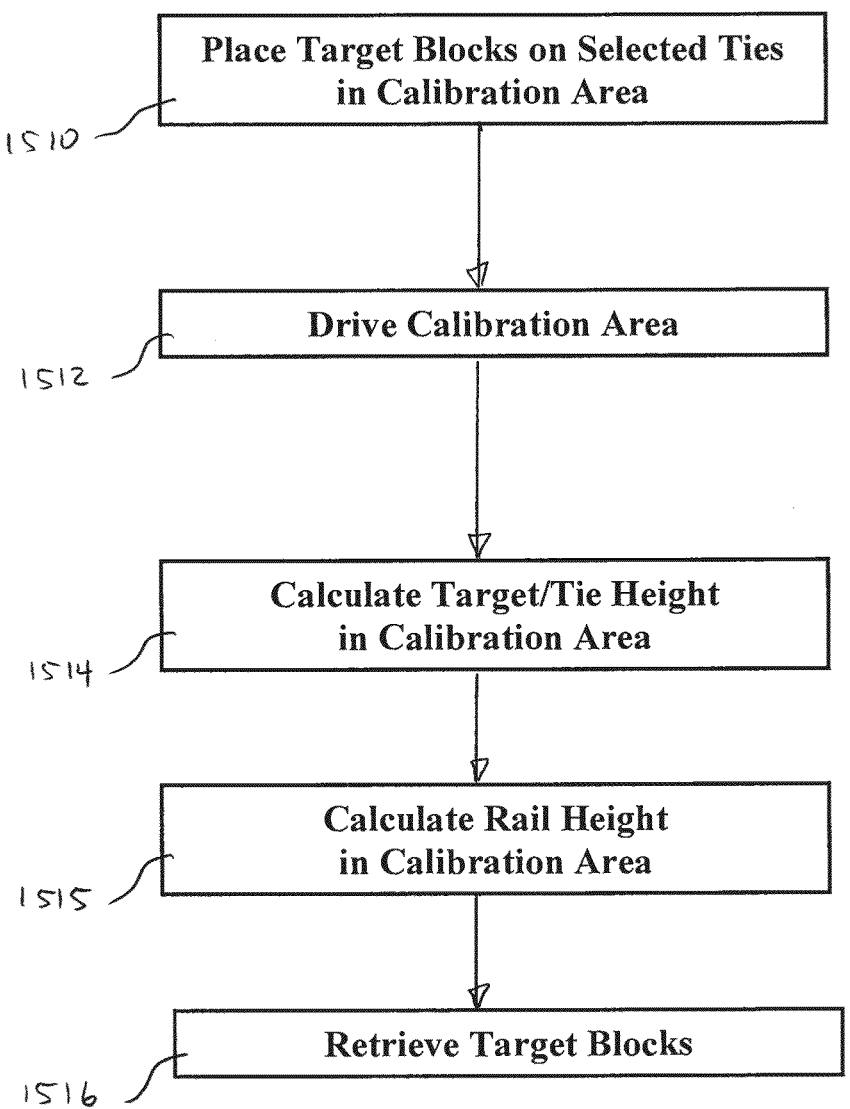
FIG. 15 is a flowchart outlining the steps in an embodiment of a method for calibrating a ballast measuring and computation system by demarking a group of selected ties with visual blocks or targets and scanning these targets using a ballast profiling vehicle like any of those shown herein.

Another approach to calibrating the ballast scanning vehicle that has been used is outlined in the flowchart of FIG. 15. This approach involves establishing the height to tie top at calibration time by demarking a group of selected ties with visual blocks or targets, indicated at block 1510. These blocks or targets can be any type of device that has a predefined shape and lies on top of the tie, and is easily visible to the LIDAR scanning systems of the vehicle. These can be generally flat targets or blocks having a significant thickness. One type of target that has been used is a flat piece of material having a highly reflective surface, such as a retro-reflective sticker. Another type of target that has been used is a block of wood of known thickness (e.g. a 4"×4"×6" block) laid atop the tie. Such blocks can also be provided with a reflective surface to facilitate their detection by the scanning system. The ballast scanning system is programmed to find the predefined shapes in the data, and identify the flat surfaces between the targets as the top surfaces of ties. The ballast scanning vehicle then passes over these ties, indicated at block 1512, and, where the blocks or targets are detected, the height to that particular tie is established by using all the point measurements from the LIDAR between the blocks either by median, mean, or other statistical methods, as discussed above. At the same time, the height to the rail top can be established by combining many measurements from the LIDAR scanner to the top of the rail.

When the data is collected, the change in distance from the scanner to the rail top is observed by computing a rolling average of the rail top height readings and comparing that to previous values. This allows the system to determine whether and when the scanning vehicle is rising or lowering as it scans. The differences in distance to the top of the rail are then applied as corrections to the measurements of height to tie top for all ties, allowing the system to calculate the ideal calibration profile, indicated at block 1514. This calculation can take into account the thickness, if any, of the targets or blocks that were placed on selected ties. Additionally, as indicated in block 1515, the system can also detect the tops of the rails during the calibration process, and calculate the height to the rail tops, and this measurement can be correlated with the tie height measurements.

One aspect of the approach depicted in FIG. 15 is that the operator of the ballast scanning vehicle must stop, get out of the truck, place the target blocks on the track (block 1510), drive the track section (block 1512), then stop again and retrieve the blocks (block 1516). This additional time and effort can be magnified depending on the number of ties that it is desired to sample and the number of calibration points that are desired, which can significantly reduce the total mileage of track that can be scanned in a given time period.

Another approach has been developed for calibrating the ballast scanning vehicle that eliminates the steps of placing and retrieving target blocks or other markers. An embodiment of this method is outlined in the flowchart of FIG. 16. This method allows the ballast scanning vehicle to be calibrated at any desired location simply by driving the scanning vehicle at a sufficiently slow speed, which can be termed a calibration speed or calibration threshold speed, for a sufficient distance. By the nature of the scanning and data collection process this condition naturally occurs at the beginning and ending of all crossings, meaning that multiple calibration sections can be established and calibration processes undertaken during any data collection run, even an extended run. Thus, the calibration process can be repeated as often as desired before and between scanning runs, especially where conditions change. For example, the height or thickness of rail varies across railroad systems. Accordingly, whenever and wherever the operator of the ballast profiling vehicle notices a change in rail size, the calibration process can be repeated before continuing with the standard scanning and profiling process.

Figure 16:
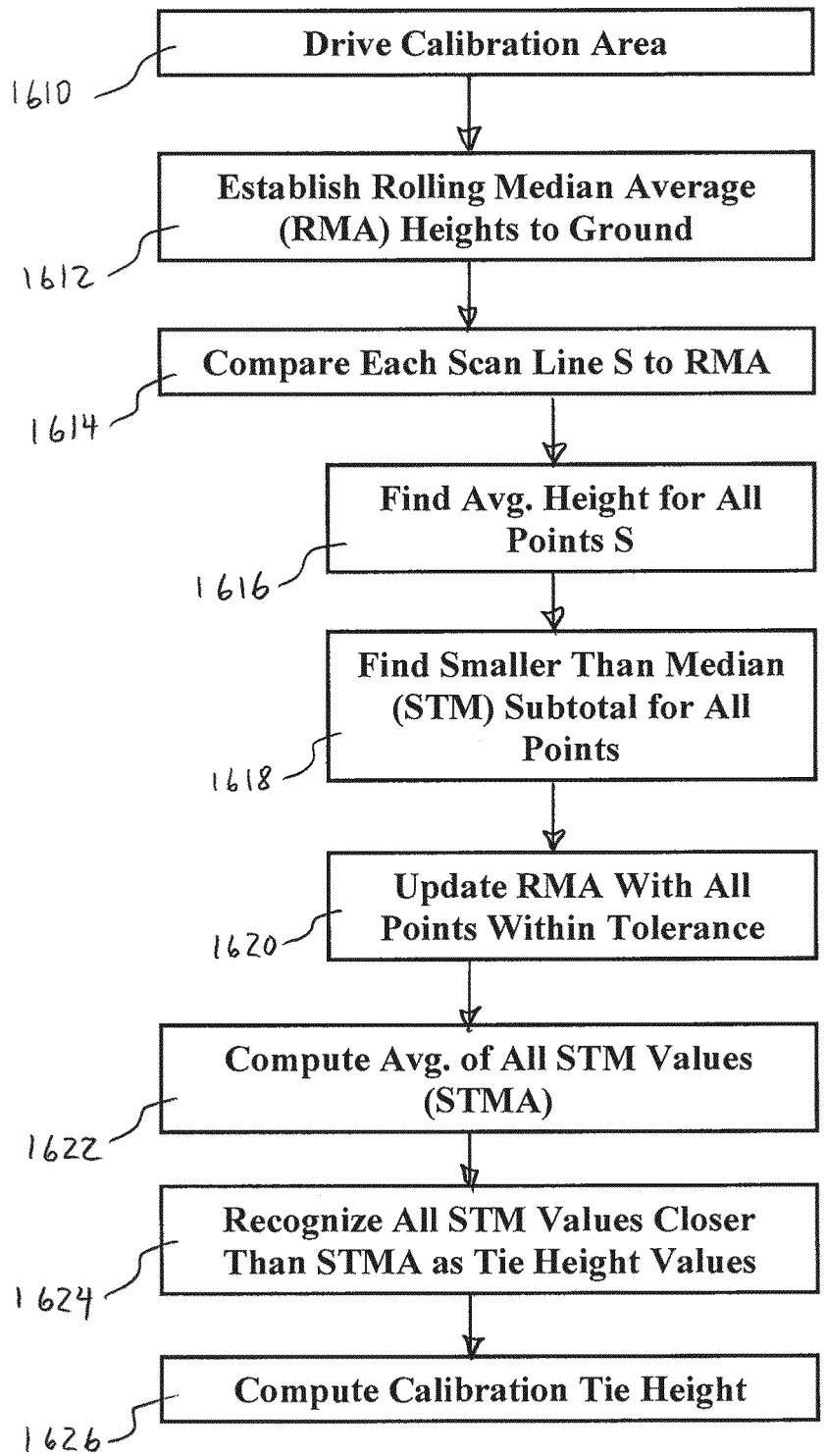
FIG. 16 is a flowchart outlining the steps in another embodiment of a method for calibrating a ballast measuring and computation system to accommodate for motion of a hi-rail ballast profiling vehicle as it travels along the rails.

As shown in FIG. 16, the first step in this method is for the ballast scanning vehicle to drive a section of track that will become a calibration area, indicated at block 1610. Calibration areas can be established by any regions in which the ballast scanning vehicle is driven sufficiently slowly for the LIDAR scanning systems to develop a volume of high resolution data for a relatively short length of track. Ordinarily, the calibration area is not specifically selected. Instead, the operator of the ballast scanning vehicle collects all scan data along an assigned section of track, and the computer processor analyzes all of the data and determines areas (by speed and length) that satisfy the requirements to be viewed as calibration areas. It will be apparent that the calibration speed for producing these results can depend at least in part on the scanning frequency of the LIDAR systems, and upon other factors such as the processing speed of the associated computer controller. In one embodiment, using a scanning system having the speed characteristics discussed above, it has been found that driving the scanning vehicle at a calibration speed of no more than 3 or 4 mph for a distance of about 6 to 10 feet can provide adequate data for calibration purposes. Other calibration distances can also be used. Advantageously, the operator of the vehicle is not required to stop at the beginning or end of the calibration procedure, but merely drives the vehicle at the slower speed for the given distance, such as at road crossings or other areas where slower speeds are typical, and can then resume scanning at the normal scanning speed.

The data obtained during the calibration run is then processed to extract the ties following several general principles, which are outlined in FIG. 16. Measurements between the lidar and the ground will be deemed to have a positive value, such that if measurements have a negative algebraic sign, the absolute value should be used. The first data processing step is to establish a Rolling Median Average (RMA) of the heights to ground in the space between the rails, referred to as the "crib," as indicated at block 1612. At this point in the process, these height to ground measurements will include both heights to tie tops and heights to the top of the ballast, since the two types of data have not yet been distinguished. Each scan line S is then compared in isolation to the RMA, as indicated at block 1614. This process includes several substeps. The first of these sub-steps is to find the average height (AH) of the points for the scan line S, as indicated at block 1616. Next, a Smaller Than Median (STM) subtotal is found, as indicated at block 1618. The STM subtotal is the sum of all points in S that have a lesser height value than the RMA.

Next, the RMA is updated with all points that are within a selected tolerance, as indicated at block 1620. The tolerance is used to reject wildly out-of-range points, like those that may represent vegetation. The next step is to compute the average of all STM values for all scans, as indicated at block 1622. This value is called STMA. At this point, a subset of all scans, called Scans On Track (SOT) are all scans with an STM value that is closer to the LIDAR in distance than the STMA height value, as indicated at block 1624. Each scan S that is a member of SOT is believed to be a scan that is on a tie, while the others are not. In other words, portions of the set of data points having a median average height that is deeper into the ground are recognized as representing regions of ballast, since individual scan beams will have much greater variation in height where there is ballast than where ties are located. This is because where there is ballast, some individual scan beams will hit the top surfaces of ballast rocks, while others will penetrate deeper into gaps between the ballast rocks, thus giving a lower average height of ground for data in the ballast region. On the other hand, portions of the set of data points having a median average height that is higher can be recognized as representing tie top surfaces because the tops of ties have fewer gaps that allow deeper penetration of the scan beams. With this information, the height to the tie at that location can be computed in the manner previously described by using only the points from scans from SOT, as indicated at block 1626.

Once the ballast scanning system is calibrated, its accuracy in estimating the amount of ballast involves registering the geometry of the ideal profile to the actual geometry of the scene, as discussed above. It is desirable that the ideal profile is matched to the tops of the ties with a relatively tight tolerance in order to be representative of all ties. However, because the ballast scanning vehicle is in constant motion, it is desirable to also account for the motion of the scanning vehicle. This motion includes up and down motion (e.g. due to the suspension of the vehicle and slight variation in relative elevation of opposite rails), cross track motion (i.e. the hi-rail vehicle wheels sliding back and forth or oscillating slightly upon the rail tops as they roll) and roll motion of the vehicle (e.g. due to the suspension of the scanning vehicle and its load).

There are a number of possible ways to account for the various sources of motion of the scanning vehicle following its calibration. One method could be to use tilt sensors, gyros or other sensors to determine the pitch, roll, and elevation change. However, this approach involves additional hardware, installation, calibration and integration, and thus imposes significant cost and perhaps additional complexity. Furthermore some types of additional equipment may not have sufficient accuracy to compensate for motion of the vehicle. For example, small changes in elevation are not typically easily measured by GPS devices or barometers. Additionally, cross track position is linear and not easily measured. The high rail wheels of a high rail vehicle are wider than the actual rail, with an inch or more of gap. This means that the High rail truck may move left to right by the amount of the gap while it drives. The location of the truck on the rail is referred to as its cross track position.

Figure 17:
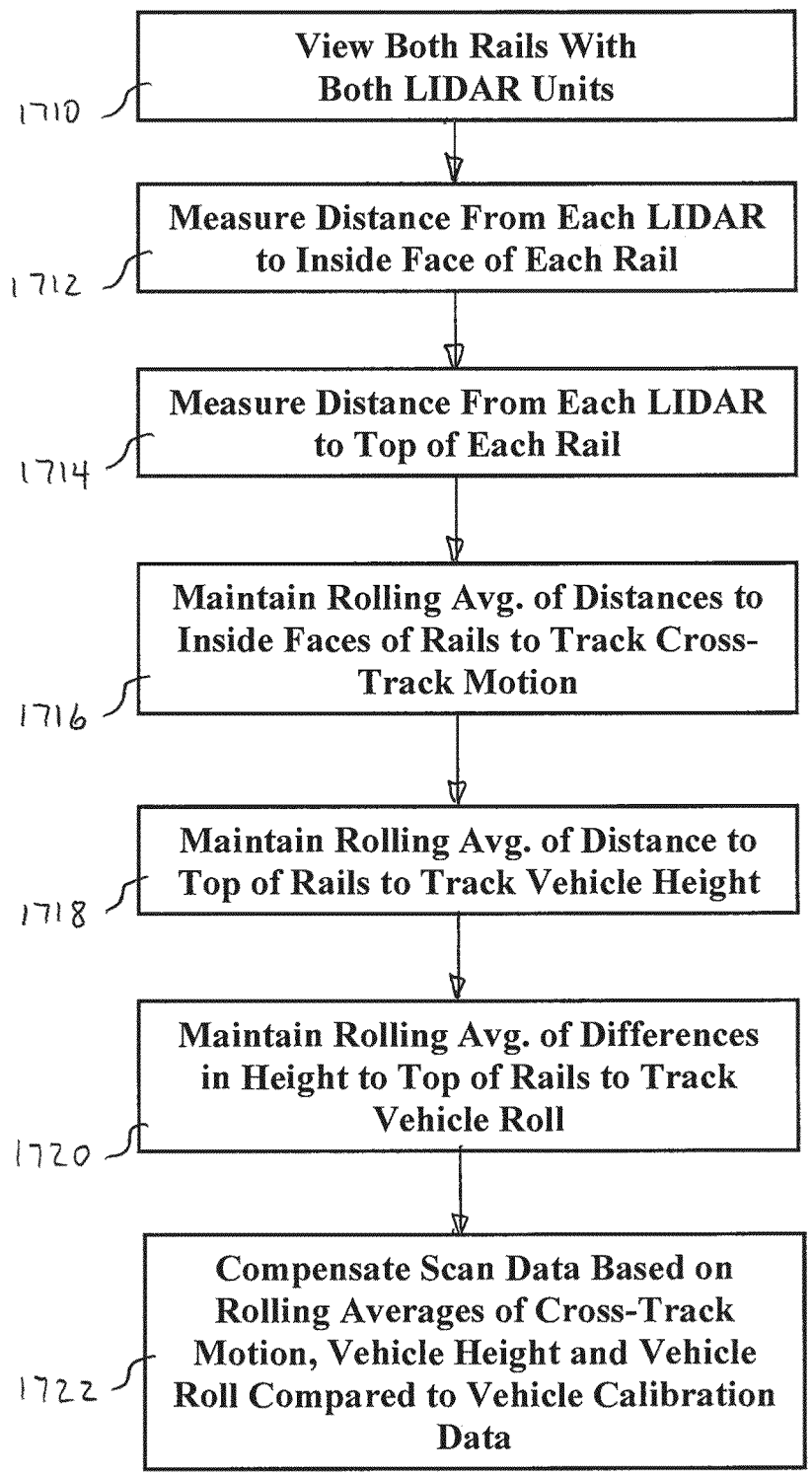
FIG. 17 is a flowchart outlining the steps in an embodiment of a method for compensating ballast survey data to accommodate motion of a ballast profiling vehicle when moving along the rails.

Advantageously, a motion compensation method has been developed that can be applied to the ballast scanning vehicle disclosed herein without the use of additional hardware. An embodiment of this method is outlined in the flowchart of FIG. 17. After calibration of the ballast scanning vehicle in the manner disclosed above, this motion compensation method involves extracting cross track motion, tilt, and vehicle height using the LIDAR scan data, by observing distance to reference landmarks, specifically the rail top and rail sides.

As discussed above, the ballast scanning vehicle disclosed herein has two LIDAR devices that can "see" the rails, and the physical distance between the LIDAR devices is known and fixed. While scanning the rails in the normal manner outlined above, both rails are viewed by both LIDAR units, as indicated at block 1710. In the course of this scanning activity, several measurements can be taken to allow compensation of the scan data for motion of the vehicle. Advantageously, each LIDAR device can see the inside face of the rails. Accordingly, the distance from each LIDAR device to one or both rails can be detected, as indicated at block 1712. Where the distance from each LIDAR device to the opposite rail is taken, these values can be averaged to provide a more accurate measurement, indicating how far off center the ballast profiling vehicle is compared to the rails. Next, the distance from each LIDAR to the top of one or both rails is also measured, as indicated at block 1714.

Using this information, cross-track position, vehicle height and vehicle roll can be computed, and the scan data can be compensated accordingly. Specifically, cross track position can be determined keeping a rolling average of the distance from each LIDAR to one or more of the rails, as indicated at block 1716. As the truck moves side-to-side across the track, this motion will be observable in the data as the LIDARs get closer to one rail and further from the other.

Truck height (or pitch of the tail of the truck) is determined directly by the distance(s) from the LIDAR to the top of the rails. A rolling average is kept of the distance from each LIDAR to one or more tops of the rails, as indicated at block 1718. As the truck moves up and down, this is observable in the data as the LIDAR's distance to the rail changes.

Finally, truck roll can be determined by comparing the distance (height) of one LIDAR to one rail top and the distance of the other LIDAR to the other rail top. The pitch of the vehicle can be calculated as the difference in these heights. A rolling average is kept of these distances on the left and right sides, as indicated at block 1720. As the truck rolls, the relative change in these values is observable in the data as the LIDARs above each rail respectively move closer to one rail top and farther from the other. With cross-track position, vehicle height and vehicle roll data in hand, the scan data can be compensated based on these rolling averages, as indicated at block 1722.

Thus, without the addition of more hardware or other devices, the ballast scanning vehicle disclosed herein can be calibrated for various geometric parameters associated with the vehicle, and the ballast profiling data can be compensated for changes in geometric relationships with the roadbed in real time as the scanning operation is performed.

Although various embodiments have been shown and described, the invention is not so limited and will be understood to include all such modifications and variations as would be apparent to one skilled in the art. For example, equivalent elements may be substituted for those specifically shown and described, certain features may be used independently of other features, and the number and configuration of various vehicle components described above may be altered, all without departing from the spirit or scope of the invention as defined in the claims that are appended hereto, or will be filed hereafter.

Such adaptations and modifications should and are intended to be comprehended within the meaning and range of equivalents of the disclosed exemplary embodiments. It is to be understood that the phraseology of terminology employed herein is for the purpose of description and not of limitation. Accordingly, the foregoing description of the exemplary embodiments of the invention, as set forth above, are intended to be illustrative, not limiting. Various changes, modifications, and/or adaptations may be made without departing from the spirit and scope of this invention.

What is claimed is:

1. A method, performed by a computer having a processor and system memory, for calculating a missing ballast volume on a section of railroad track, comprising:
    scanning a calibration section of railroad track using a remote sensing system upon a rail vehicle, and determining a calibration tie height relative to the rail vehicle, the calibration tie height representing a distance from the remote sensing system to a top surface of a railroad tie there beneath;
    scanning an existing section of railroad track using the remote sensing system to produce a set of data points representing an existing surface of the existing section of the railroad track;
    adjusting the scan set of data points representing the existing surface based upon the determined calibration tie height;
    registering an ideal surface with reference to the existing surface to create a volume, the ideal surface defining a full volume level;
    determining a number of scan points that fall within the volume and lie below the full volume level;
    obtaining an incremental cross-sectional area by multiplying a coordinate for each scan point that lies below the full volume level by a magnitude below the full volume level and a weighted factor associated with the volume, wherein the weighted factor is a point weighting factor or a variable weighting factor; and
    accumulating a total missing ballast volume by multiplying the incremental cross-sectional area by an incremental distance between scan locations and adding all results.

2. A method in accordance with claim 1, wherein the remote sensing system comprises a LIDAR system.

3. A method in accordance with claim 1, further comprising compensating for possible irregularities in the data points representing the existing surface by the steps of:
    defining an arbitrary surface;
    finding points in the set of data points that represent the existing railroad track surface;
    identifying landmark points of the existing railroad track surface within the set of data points;

comparing locations of the landmark points in the set of data points to expected locations of the landmark points;

calculating a positional difference between the locations of the landmark points and the expected locations;

transforming the set of data points by the positional difference;

registering the arbitrary surface to the location of the landmark points; and updating the expected location of landmark points for subsequent scenes using the transformed set of data points.

4. A method in accordance with claim 1, further comprising:

providing a graphical user interface having an interactive map of the section of railroad track; and displaying ballast data on the interactive map.

5. A method in accordance with claim 4, wherein the ballast data is selected from the group consisting of: No Dump Zone (NDZ) begin and end points; quantity of ballast needed; number of ballast hopper car gates of ballast to drop for a given train speed; locations at which to drop ballast; curves and spiral easements; and truck position.

6. A method in accordance with claim 4, further comprising delivering to the scan section and the existing section of the railroad track, via a ballast delivery train, a volume of ballast substantially equal to the total missing ballast volume.

7. A method in accordance with claim 1, wherein the step of scanning the calibration section of railroad track comprises traversing the calibration section of railroad track with the rail vehicle below a calibration speed.

8. A method in accordance with claim 7, wherein the calibration speed is no more than about 4 mph.

9. A method in accordance with claim 1, wherein determining the calibration tie height further comprises:

establishing a rolling median average of height to ground measurements for the rail vehicle;

comparing each scan value to the rolling median average;

computing an average of a group of smaller than median subtotals for all scan values; and identifying all smaller than median subtotals that are closer to the average of the smaller than median subtotals as representing the calibration tie height value.

10. A method in accordance with claim 9, wherein comparing each scan value to the rolling median average further comprises:

finding an average height for all measured points;

finding the smaller than median subtotal for all points; and updating the rolling median average with all measured points.

11. A method in accordance with claim 1, further comprising adjusting the scan set of data points representing the existing surface to compensate for motion of the rail vehicle while scanning the existing section of railroad track.

12. A method in accordance with claim 11, wherein compensating for motion of the rail vehicle while scanning the existing section of railroad track comprises analyzing the scan data to determine at least one of sensor height above the rails, and lateral position of the sensors relative to the rails.

13. A method in accordance with claim 12, wherein analyzing the scan data comprises maintaining a rolling average of scanner height relative to each rail, maintaining a rolling average of comparative distances of each scanner to inside faces of opposing rails, and maintaining a rolling average of differences in height of to determine at least one of sensor height above the rails, and lateral position of the sensors relative to the rails.

14. A method, performed by a computer having a processor and system memory, for calibrating a tie height of a ballast profiling rail vehicle having a remote sensing system, the method comprising:

traversing the rail vehicle along a first calibration section of railroad track at a calibration speed;

detecting, using the remote sensing system, a plurality of height to tie measurements in the first calibration section, the height to tie measurements representing a distance from the remote sensing system to a top surface of a railroad tie there beneath;

establishing a rolling median average of the height to tie measurements, determining a calibration tie height relative to the rail vehicle based upon the rolling median average;

traversing the rail vehicle along a first existing section of railroad track at a scanning speed to produce a set of data points representing an existing surface of the first existing section of the railroad track;

continuously adjusting the scan set of data points representing the existing surface based upon the determined calibration tie height; and calculating a missing ballast volume of the first existing section of railroad track based upon the adjusted scan set of data points.

15. A method in accordance with claim 14, wherein the remote sensing system comprises a LIDAR system.

16. A method in accordance with claim 14, wherein determining the calibration tie height further comprises:

comparing each height to tie measurement to the rolling median average;

computing an average of a group of smaller than median subtotals for all scan values; and identifying all smaller than median subtotals that are closer to the average of the smaller than median subtotals as representing the calibration tie height value.

17. A method in accordance with claim 14, further comprising continuously adjusting the scan set of data points representing the existing surface to compensate for motion of the rail vehicle while scanning the first existing section of railroad track by analyzing the scan data to determine at least one of sensor height above the rails, and lateral position of the sensors relative to the rails.

18. A method in accordance with claim 14, further comprising:

traversing the rail vehicle along a second calibration section of railroad track at the calibration speed;

detecting, using the remote sensing system, a second plurality of height to tie measurements in the second calibration section;

establishing a rolling median average of the second plurality of height to tie measurements;

determining a modified calibration tie height relative to the rail vehicle based upon the rolling median average of the second plurality of height to tie measurements;

traversing the rail vehicle along a second existing section of railroad track at the scanning speed to produce a set of data points representing an existing surface of the second existing section of the railroad track;

continuously adjusting the scan set of data points representing the existing surface based upon the modified calibration tie height; and calculating a missing ballast volume of the second existing section of railroad track based upon the adjusted scan set of data points.

19. A method in accordance with claim 18, further comprising continuously adjusting the scan set of data points representing the existing surface to compensate for motion of the rail vehicle while scanning the second existing section of railroad track by analyzing the scan data to determine at least one of sensor height above the rails, and lateral position of the sensors relative to the rails.

20. A method, performed by a computer having a processor and system memory, for calculating a missing ballast volume on a section of railroad track, comprising:

scanning a calibration section of railroad track using a LIDAR system upon a rail vehicle, and determining a calibration tie height relative to the rail vehicle, the calibration tie height representing a distance from the LIDAR system to a top surface of a railroad tie there beneath;

scanning an existing section of railroad track using the LIDAR system to produce a set of data points representing an existing surface of the existing section of the railroad track;

obtaining an incremental cross-sectional area by multiplying a coordinate for each data point that lies below a full volume level by a magnitude below the full volume level and a weighted factor associated with the volume, wherein the weighted factor is a point weighting factor or a variable weighting factor; and using the scan set of data points and the calibration tie height to distinguish tie surfaces and ballast surfaces to register an ideal surface with reference to the existing surface, and determining a total missing ballast volume for the calibration section and the existing section using the incremental cross-sectional area and an incremental distance between scan locations.

21. A method in accordance with claim 20, wherein the step of using the scan set of data points and the calibration tie height to distinguish tie surfaces and ballast surfaces comprises:

establishing a rolling median average of height to ground measurements for the rail vehicle; and identifying portions of the set of data points having a median average height that is deeper into the ground as representing regions of ballast, and identifying portions of the set of data points having a median average height that is higher as representing tie top surfaces.

22. A method in accordance with claim 20, further comprising adjusting the scan set of data points representing the existing surface to compensate for motion of the rail vehicle while scanning the existing section of railroad track.

23. A method in accordance with claim 20, further comprising delivering to the scan section and the existing section of the railroad track, via a ballast delivery train, a volume of ballast substantially equal to the total missing ballast volume.

\* \* \* \* \*